United States Patent
Huang et al.

(10) Patent No.: US 11,812,436 B2
(45) Date of Patent: Nov. 7, 2023

(54) UPLINK CONTROL SPATIAL RELATION UPDATE WITH UPLINK CONTROL CARRIER SWITCH

(71) Applicant: QUALCOMM Incorporated, San Diego, CA (US)

(72) Inventors: Yi Huang, San Diego, CA (US); Yan Zhou, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 17/473,913

(22) Filed: Sep. 13, 2021

(65) Prior Publication Data

US 2023/0084618 A1 Mar. 16, 2023

(51) Int. Cl.
*H04W 72/00* (2023.01)
*H04W 72/21* (2023.01)
*H04L 5/00* (2006.01)
*H04W 72/044* (2023.01)

(52) U.S. Cl.
CPC ........... *H04W 72/21* (2023.01); *H04L 5/0055* (2013.01); *H04W 72/044* (2013.01)

(58) Field of Classification Search
None
See application file for complete search history.

(56) References Cited

U.S. PATENT DOCUMENTS

| 9,351,287 | B2 * | 5/2016 | Lan | H04L 5/003 |
| 2020/0314860 | A1 * | 10/2020 | Zhou | H04W 72/23 |
| 2022/0322358 | A1 * | 10/2022 | Zhou | H04W 72/21 |

FOREIGN PATENT DOCUMENTS

WO 2021011442 A1 1/2021

OTHER PUBLICATIONS

International Search Report and Written Opinion—PCT/US2022/041540—ISA/EPO—dated Dec. 6, 2022.
VIVO: "Further Discussion on Multi Beam Enhancement", 3GPP TSGRAN WG1 #106-e, R1-2106571, e-Meeting, Aug. 16-27, 2021, XP052037877, 30 Pages, Sections 2, 3, 6.

* cited by examiner

*Primary Examiner* — Michael J Moore, Jr.
*Assistant Examiner* — Gautam Sharma
(74) *Attorney, Agent, or Firm* — Loza & Loza, LLP

(57) ABSTRACT

Aspects of the disclosure relate to communicating uplink control information. In an aspect, a first device receives from a second device configuration information including an indication to transmit uplink control information via a primary component carrier (PCC) or a given secondary component carrier (SCC) of at least one SCC in a slot. The first device also receives from the second device mapping information indicating an enabled spatial relation information configured for the PCC or the given SCC for transmitting the uplink control information. Thereafter, the first device identifies the enabled spatial relation information from the mapping information and transmits to the second device the uplink control information on the PCC or the given SCC in the slot based on the indication included in the configuration information, the enabled spatial relation information, and an uplink resource mapped to the enabled spatial relation information.

30 Claims, 17 Drawing Sheets

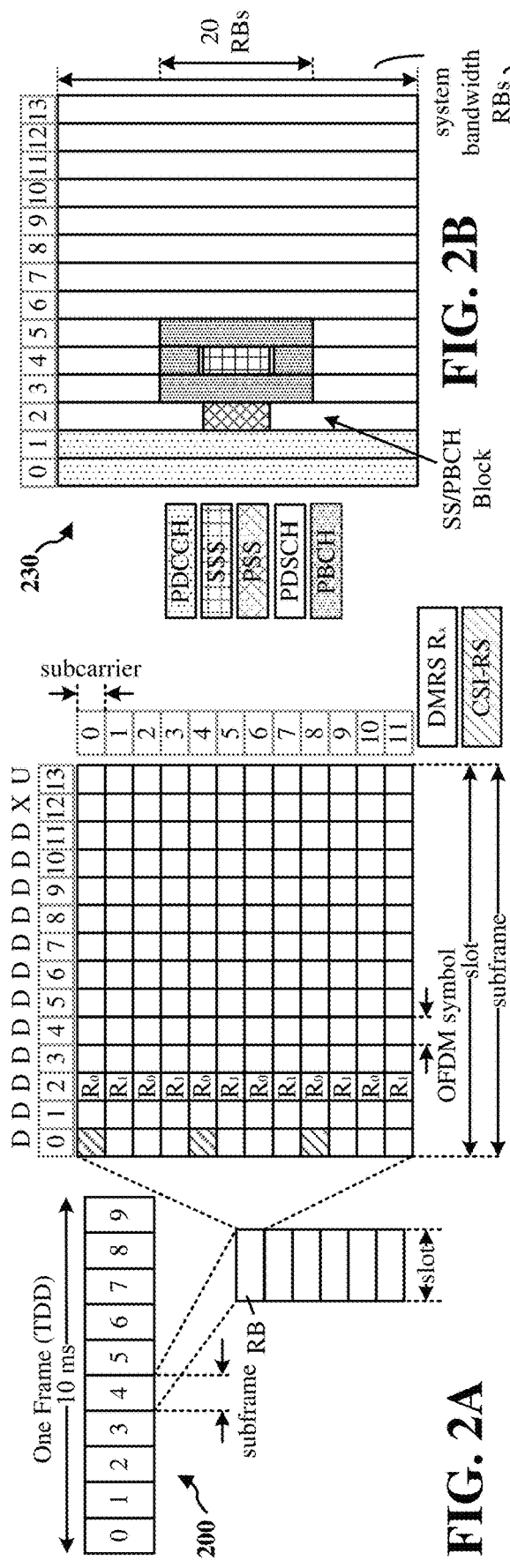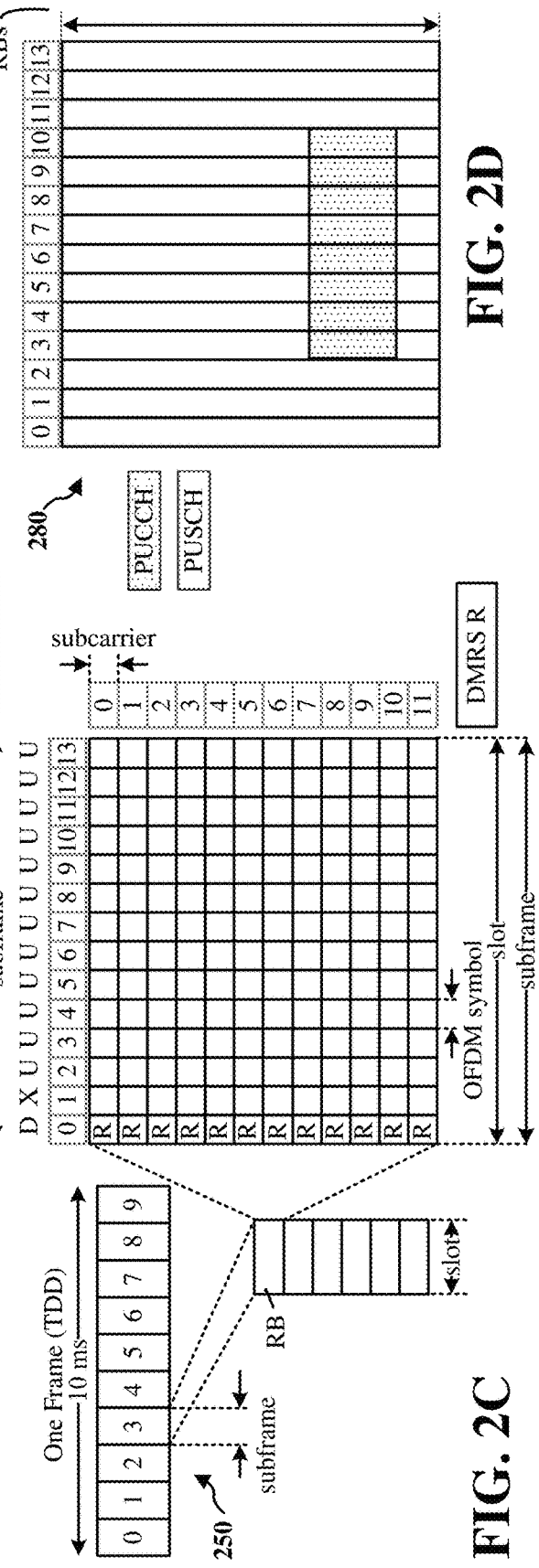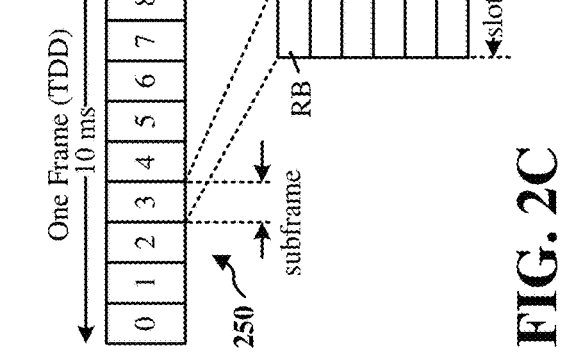

UPLINK CONTROL SPATIAL RELATION UPDATE WITH UPLINK CONTROL CARRIER SWITCH

INTRODUCTION

The present disclosure relates generally to communication systems, and more particularly, to updating uplink control spatial relation information to facilitate uplink control transmission on various component carriers.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example telecommunication is 5G new radio (NR). 5G NR is part of a continuous mobile broadband evolution promulgated by Third Generation Partnership Project (3GPP) to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

SUMMARY

The following presents a summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a form as a prelude to the more detailed description that is presented later.

In one example, a method of communicating uplink control information at a first device is disclosed. The method includes receiving configuration information from a second device, the configuration information including an indication to transmit uplink control information via a primary component carrier (PCC) or a given secondary component carrier (SCC) of at least one SCC in a slot, receiving mapping information from the second device, wherein the mapping information comprises an identification of one or more first uplink resources in the PCC configured for transmitting the uplink control information and an identification of one or more first spatial relation information configured for the PCC respectively mapped to the one or more first uplink resources in the PCC, and for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC, wherein the mapping information indicates an enabled spatial relation information of the one or more first spatial relation information or the one or more second spatial relation information configured for the PCC or the given SCC for transmitting the uplink control information, and transmitting, to the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

In another example, a first device for communicating uplink control information is disclosed. The first device includes at least one processor and a memory coupled to the at least one processor. The at least one processor and the memory are configured to receive configuration information from a second device, the configuration information including an indication to transmit uplink control information via a primary component carrier (PCC) or a given secondary component carrier (SCC) of at least one SCC in a slot and receive mapping information from the second device. The mapping information comprises an identification of one or more first uplink resources in the PCC configured for transmitting the uplink control information and an identification of one or more first spatial relation information configured for the PCC respectively mapped to the one or more first uplink resources in the PCC. The mapping information further comprises, for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC, wherein the mapping information indicates an enabled spatial relation information of the one or more first spatial relation information or the one or more second spatial relation information configured for the PCC or the given SCC for transmitting the uplink control information. The at least one processor and the memory are further configured to transmit, to the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

In a further example, a first device for communicating uplink control information is disclosed. The first device includes means for receiving configuration information from a second device, the configuration information including an indication to transmit uplink control information via a primary component carrier (PCC) or a given secondary component carrier (SCC) of at least one SCC in a slot, means for receiving mapping information from the second device, wherein the mapping information comprises an identification of one or more first uplink resources in the PCC configured for transmitting the uplink control information and an identification of one or more first spatial relation information configured for the PCC respectively mapped to the one or more first uplink resources in the PCC, and for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC, wherein the mapping information indicates an enabled spatial relation information of the one or more first spatial relation information or the one or more second spatial relation information configured for the PCC or the given SCC for transmitting the uplink control information, and means for transmitting, to the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

In another example, a non-transitory computer-readable medium storing computer-executable code at a first device for communicating uplink control information is disclosed. The non-transitory computer-readable medium includes code for causing a computer to transmit uplink control information via a primary component carrier (PCC) or a given secondary component carrier (SCC) of at least one SCC in a slot and receive mapping information from the second device. The mapping information comprises an identification of one or more first uplink resources in the PCC configured for transmitting the uplink control information and an identification of one or more first spatial relation information configured for the PCC respectively mapped to the one or more first uplink resources in the PCC. The mapping information further comprises, for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC, wherein the mapping information indicates an enabled spatial relation information of the one or more first spatial relation information or the one or more second spatial relation information configured for the PCC or the given SCC for transmitting the uplink control information. The non-transitory computer-readable medium further includes code for causing the computer to transmit, to the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

In a further example, a method of communicating uplink control information at a first device is disclosed. The method includes transmitting configuration information to a second device, the configuration information including an indication to transmit uplink control information via a primary component carrier (PCC) or a given secondary component carrier (SCC) of at least one SCC in a slot, transmitting mapping information to the second device, wherein the mapping information comprises an identification of one or more first uplink resources in the PCC configured for transmitting the uplink control information and an identification of one or more first spatial relation information configured for the PCC respectively mapped to the one or more first uplink resources in the PCC, and for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC, wherein the mapping information indicates an enabled spatial relation information of the one or more first spatial relation information or the one or more second spatial relation information configured for the PCC or the given SCC for transmitting the uplink control information, and receiving, from the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

In another example, a first device for communicating uplink control information is disclosed. The first device includes at least one processor and a memory coupled to the at least one processor. The at least one processor and the memory are configured to transmit configuration information to a second device, the configuration information including an indication to transmit uplink control information via a primary component carrier (PCC) or a given secondary component carrier (SCC) of at least one SCC in a slot, and transmit mapping information to the second device. The mapping information comprises an identification of one or more first uplink resources in the PCC configured for transmitting the uplink control information and an identification of one or more first spatial relation information configured for the PCC respectively mapped to the one or more first uplink resources in the PCC, and for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC, wherein the mapping information indicates an enabled spatial relation information of the one or more first spatial relation information or the one or more second spatial relation information configured for the PCC or the given SCC for transmitting the uplink control information. The at least one processor and the memory are further configured to receive, from the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

In a further example, a first device for communicating uplink control information is disclosed. The first device includes means for transmitting configuration information to a second device, the configuration information including an indication to transmit uplink control information via a primary component carrier (PCC) or a given secondary component carrier (SCC) of at least one SCC in a slot, means for transmitting mapping information to the second device, wherein the mapping information comprises an identification of one or more first uplink resources in the PCC configured for transmitting the uplink control information and an identification of one or more first spatial relation information configured for the PCC respectively mapped to the one or more first uplink resources in the PCC, and for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC, wherein the mapping information indicates an enabled spatial relation information of the one or more first spatial relation information or the one or more second spatial relation information configured for the PCC or the given SCC for transmitting the uplink control information, and means for receiving, from the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

In another example, a non-transitory computer-readable medium storing computer-executable code at a first device for communicating uplink control information is disclosed. The non-transitory computer-readable medium includes code for causing a computer to transmit configuration information to a second device, the configuration information including an indication to transmit uplink control information via a primary component carrier (PCC) or a given secondary component carrier (SCC) of at least one SCC in a slot, and transmit mapping information to the second device. The mapping information comprises an identification of one or more first uplink resources in the PCC configured for transmitting the uplink control information and an identification of one or more first spatial relation information configured for the PCC respectively mapped to the one or more first uplink resources in the PCC, and for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC, wherein the mapping information indicates an enabled spatial relation information of the one or more first spatial relation information or the one or more second spatial relation information configured for the PCC or the given SCC for transmitting the uplink control information. The non-transitory computer-readable medium further includes code for causing the computer to receive, from the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
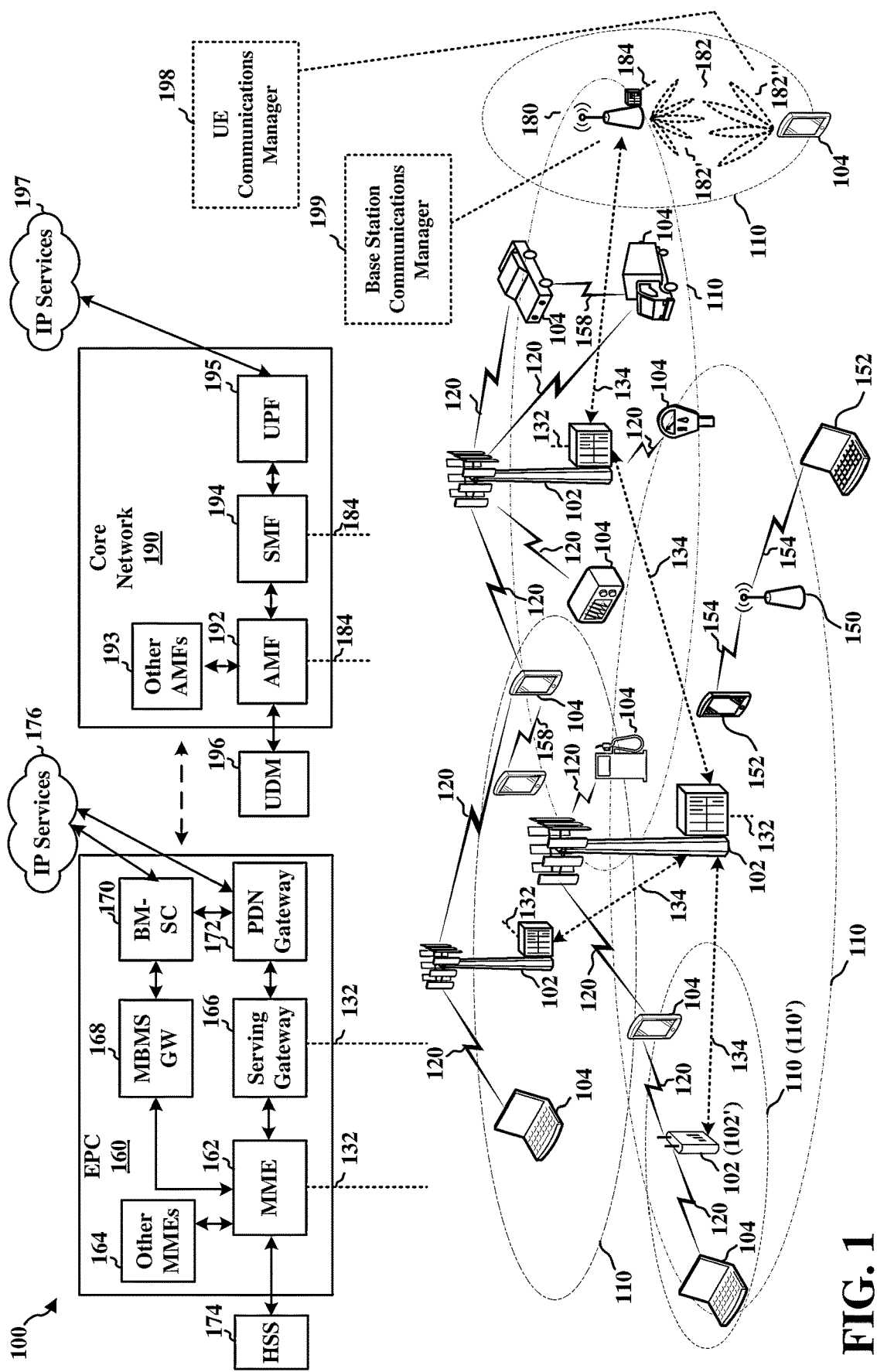
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A physical uplink control channel (PUCCH) group is a group of component carriers including a primary component carrier (PCC or PCell) and one or more secondary component carriers (SCCs or SCells). Currently, in communication systems, such as 5G NR Release 15 or Release 16, for uplink carrier aggregation, PUCCH (control information) can only be transmitted on the PCC in the PUCCH group. PUCCH cannot be transmitted on an SCC. Rather, the SCC can only be used to transmit a physical uplink shared channel (PUSCH), i.e., data and some reference signals. Notably, if the PCC has a time division duplex (TDD) configuration, then the transmission of PUCCH may be subject to large delay based on how a time pattern of uplink transmission slots, downlink transmission slots, and special uplink/downlink transition transmission slots (U/D/S pattern) is configured in the PCC. For example, delay may occur if an uplink transmission opportunity for sending PUCCH (e.g., in an uplink slot or special slot) in the PCC is not available until after the passing of one or more downlink slots in which uplink transmissions may not occur.

In order to reduce the delay or latency in transmitting PUCCH, aspects of the disclosure provide for transmitting PUCCH on SCC in addition to PCC in a PUCCH group. For example, uplink transmission opportunities for sending PUCCH (e.g., in an uplink slot or special slot) in the SCC may be available prior to the availability of an uplink transmission opportunity in the PCC. Thus, the delay may be reduced if the PUCCH is sent via an earlier occurring uplink transmission opportunity in the SCC rather than the PCC. Aspects of the disclosure also provide for indicating which component carrier (PCC or SCC) to use to transmit PUCCH and updating a beam direction for transmitting PUCCH (PUCCH spatial relation information).

Aspects of the disclosure provide for a method, an apparatus, and a computer-readable medium for communicating uplink control information. For example, a UE may receive, from a base station (e.g., gNB) configuration information including an indication to transmit uplink control information via a primary component carrier (PCC) or a given secondary component carrier (SCC) of at least one SCC in a slot. The UE may also receive, from the base station, mapping information indicating an enabled spatial relation information configured for the PCC or the given SCC for transmitting the uplink control information. Thereafter, the UE may identify the enabled spatial relation information from the mapping information and transmit to the base station the uplink control information on the PCC or the given SCC in the slot based on the indication included in the configuration information, the enabled spatial relation information, and an uplink resource mapped to the enabled spatial relation information.

In another example, a base station (e.g., gNB) may generate configuration information including an indication to transmit uplink control information via a primary component carrier (PCC) or a given secondary component carrier (SCC) of at least one SCC in a slot and transmit the configuration information to a UE. The base station may further generate mapping information indicating an enabled spatial relation information configured for the PCC or the given SCC for transmitting the uplink control information and transmit the mapping information to the UE. Thereafter, the base station may receive, from the UE, the uplink control information on the PCC or the given SCC in the slot based on the indication included in the configuration information, the enabled spatial relation information, and an uplink resource mapped to the enabled spatial relation information.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

In some examples, the wireless communications system and access network 100 may employ an open RAN (O-RAN) to provide a standardization of radio interfaces to procure interoperability between component radio equipment. For example, in an O-RAN, the RAN may be disaggregated into a centralized unit (O-CU), a distributed unit (O-DU), and a radio unit (O-RU). The O-RU is where radio frequency (RF) signals are transmitted, received, amplified, and/or digitized. The O-RU may be located at, near, or integrated with, an antenna. The O-DU and the O-CU provide computational functions and may facilitate the transmission of digitized radio signals within the network. The O-DU may be physically located at or near the O-RU. The O-CU may be located near the core network.

The O-DU provides downlink and uplink baseband processing, a supply system synchronization clock, signal processing, and an interface with the O-CU. The O-RU provides downlink baseband signal conversion to an RF signal, and uplink RF signal conversion to a baseband signal. The O-RAN may include an open fronthaul (FH) interface between the O-DU and the O-RU. Aspects of the disclosure, may be applicable to an aggregated RAN and/or to a disaggregated RAN (e.g., an O-RAN).

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE communications manager 198 that may be configured to receive from a gNB configuration information including an indication to transmit uplink control information via a primary component carrier (PCC) or a given secondary component carrier (SCC) of at least one SCC in a slot. The UE communications manager 198 may also be configured to receive from the gNB mapping information indicating an enabled spatial relation information configured for the PCC or the given SCC for transmitting the uplink control information. Thereafter, the UE communications manager 198 may be configured to identify the enabled spatial relation information from the mapping information and transmit to the gNB the uplink control information on the PCC or the given SCC in the slot based on the indication included in the configuration information, the enabled spatial relation information, and an uplink resource mapped to the enabled spatial relation information.

Referring again to FIG. 1, in certain aspects, the base station 102 may include a base station communications manager 199 that may be configured to generate configuration information including an indication to transmit uplink control information via a primary component carrier (PCC) or a given secondary component carrier (SCC) of at least one SCC in a slot and transmit the configuration information to a UE. The base station communications manager 199 may further be configured to generate mapping information indicating an enabled spatial relation information configured for the PCC or the given SCC for transmitting the uplink control information and transmit the mapping information to the UE. Thereafter, the base station communications manager 199 may be configured to receive, from the UE, the uplink control information on the PCC or the given SCC in the slot based on the indication included in the configuration information, the enabled spatial relation information, and an uplink resource mapped to the enabled spatial relation information.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. Aspects of the disclosure related to communicating uplink control information may implement signaling using the 5G/NR frame structure described with respect to FIGS. 2A, 2B, 2C, and 2D. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
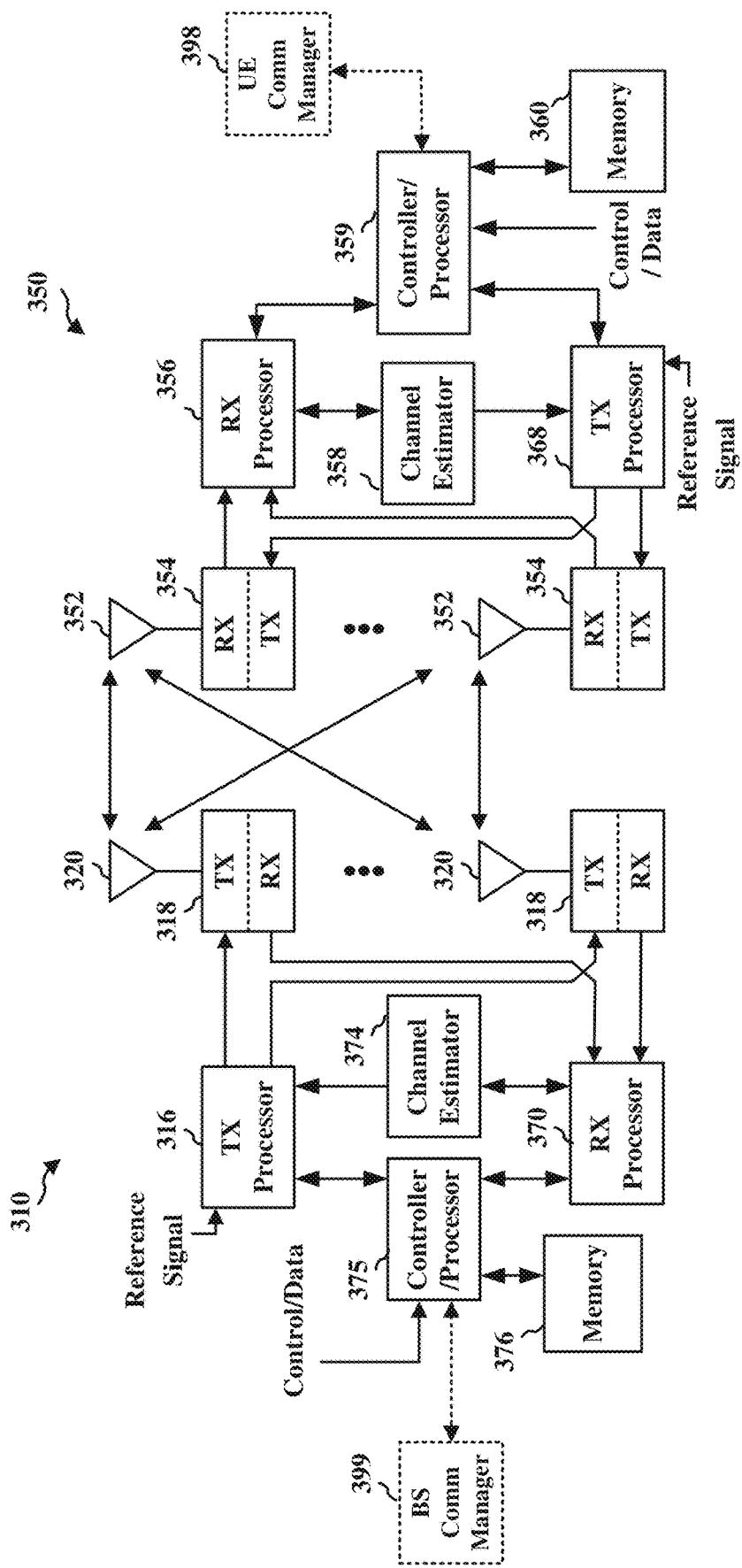
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission. Antennas 320 may correspond to antenna elements and/or antenna arrays described below with respect to FIG. 16. Moreover, each transmitter 318TX may include a phase-shifter (e.g., phase-shifter 1616 of FIG. 16) for enabling digital and/or analog beamforming operations via a respective antenna 320 according to aspects of the present disclosure.

At the UE 350, each receiver 354RX receives a signal through its respective antenna 352. Antennas 352 may correspond to antenna elements and/or antenna arrays described below with respect to FIG. 14. Each receiver 354RX may include a phase-shifter (e.g., phase-shifter 1416 of FIG. 14) for enabling digital and/or analog beamforming operations via a respective antenna 352 according to aspects of the present disclosure. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE communications manager 198 of FIG. 1. For example, the UE 350 may include a UE communications manager 398 configured to perform the operations described above with respect to the UE communications manager 198 of FIG. 1.

At least one of the TX processor 316, the RX processor 370, and the controller/processor 375 may be configured to perform aspects in connection with the BS communications manager 199 of FIG. 1. For example, the BS 310 may include a BS communications manager 399 configured to perform the operations described above with respect to the BS communications manager 199 of FIG. 1.

Beamforming technology (e.g., 5G NR mmW technology) may use beam management procedures, such as beam measurements and beam switches, to maintain a quality of a link between a base station (e.g., gNB) and a UE at a sufficient level. Beam management procedures aim to support mobility and the selection of the best beam pairing (or beam pair link (BPL)) between the base station and the UE. Beam selection may be based on a number of considerations including logical state, power saving, robustness, mobility, throughput, etc. For example, wide beams may be used for initial connection and for coverage/mobility and narrow beams may be used for high throughput scenarios with low mobility.

Aspects of the disclosure relate to facilitating transmission of a physical uplink control channel (PUCCH) on a primary component carrier (PCC or PCell) and one or more secondary component carriers (SCCs or SCells) (which may be referred to as "PUCCH carrier switch") and updating a PUCCH spatial relation with PUCCH carrier switch. A PUCCH spatial relation refers to a beam direction in which the PUCCH is transmitted in FR2. In an aspect, a gNB may update the PUCCH transmission beam direction when PUCCH carrier switch is implemented. Accordingly, a UE may abide by the gNB update and update the PUCCH transmission beam direction at the UE side to transmit the PUCCH when PUCCH carrier switch is implemented.

Figure 4:
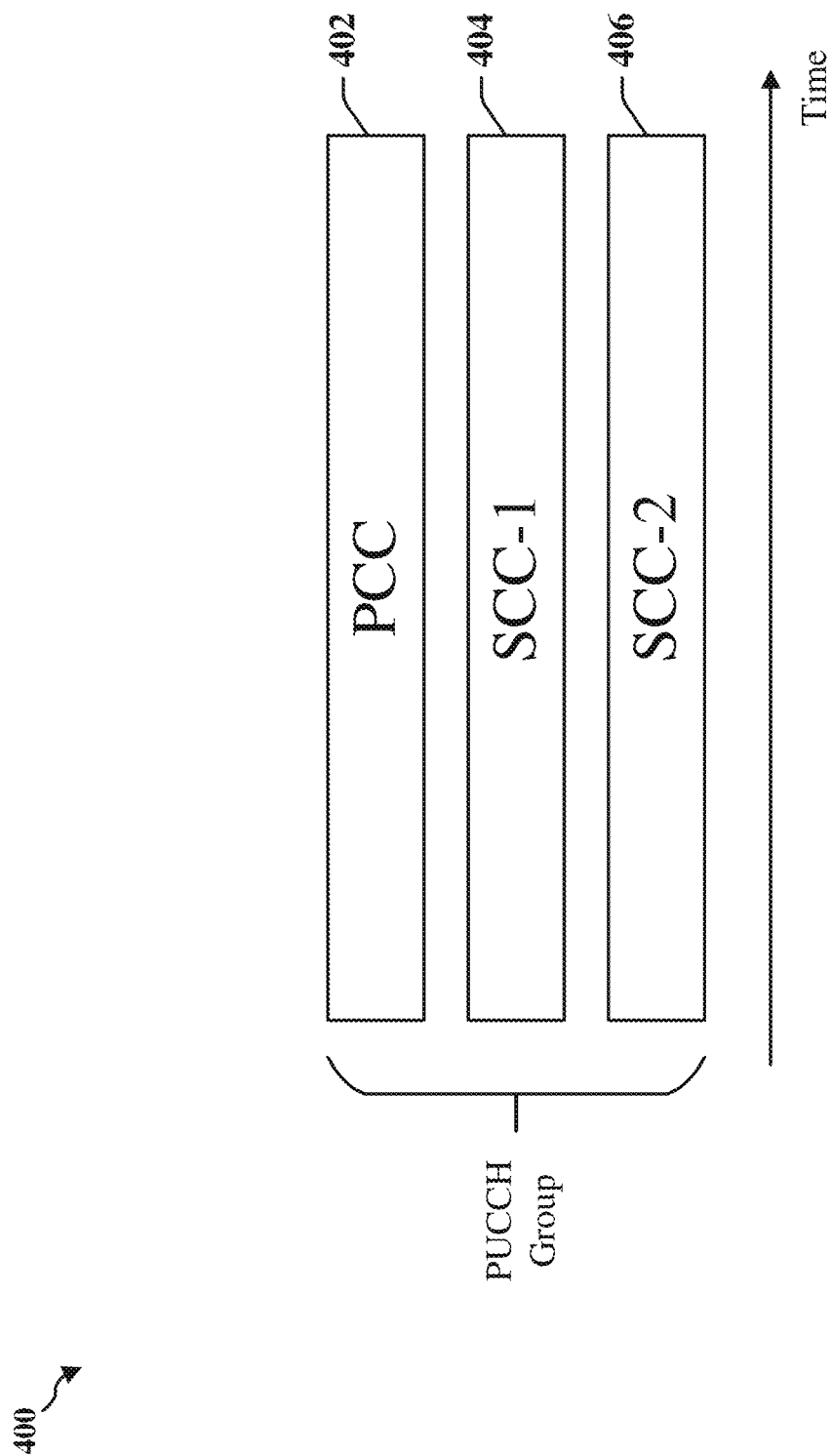
FIG. 4 illustrates an example of a PUCCH group in accordance with aspects of the present disclosure.

FIG. 4 illustrates an example of a PUCCH group 400. A PUCCH group refers to a group of component carriers (CCs). For example, the PUCCH group 400 may include three component carriers—a primary component carrier (PCC or PCell) 402, a first secondary component carrier (SCC-1 or SCell-1) 404, and a second secondary component carrier (SCC-2 or SCell-2) 406. In certain communication systems (e.g., 5G NR Release 15 or Release 16), in uplink carrier aggregation, a UE can only transmit PUCCH on PCC 402 in the PUCCH group. The UE cannot transmit PUCCH on SCC-1 404 or SCC-2 406. Thus, for these communication systems, the UE may transmit a physical uplink shared channel (PUSCH) and some reference signals on SCC-1 404 and SCC-2 406 but no control information.

Notably, if PCC 402 has a time division duplex (TDD) configuration, then the transmission of PUCCH may be subject to large delay based on how a time pattern of uplink transmission slots, downlink transmission slots, and special uplink/downlink transition transmission slots (U/D/S time pattern) is configured in PCC 402. For example, delay may occur if an uplink transmission opportunity for sending PUCCH (e.g., in an uplink slot or special slot) in PCC 402 is not available until after the passing of one or more downlink slots in which uplink transmissions may not occur.

To reduce the delay or latency in transmitting PUCCH, aspects of the disclosure provide for transmitting PUCCH on SCC (e.g., SCC-1 402 and/or SCC-2 404) in addition to PCC 402. PUCCH can be transmitted on any component carrier in the PUCCH group 400. For example, uplink transmission opportunities for sending PUCCH (e.g., in an uplink slot or special slot) on SCC-1 404 or SCC-2 406 may be available prior to the availability of an uplink transmission opportunity on PCC 402. Thus, the delay may be reduced if the PUCCH is sent via an earlier occurring uplink transmission opportunity in the SCC rather than the PCC.

Figure 5:
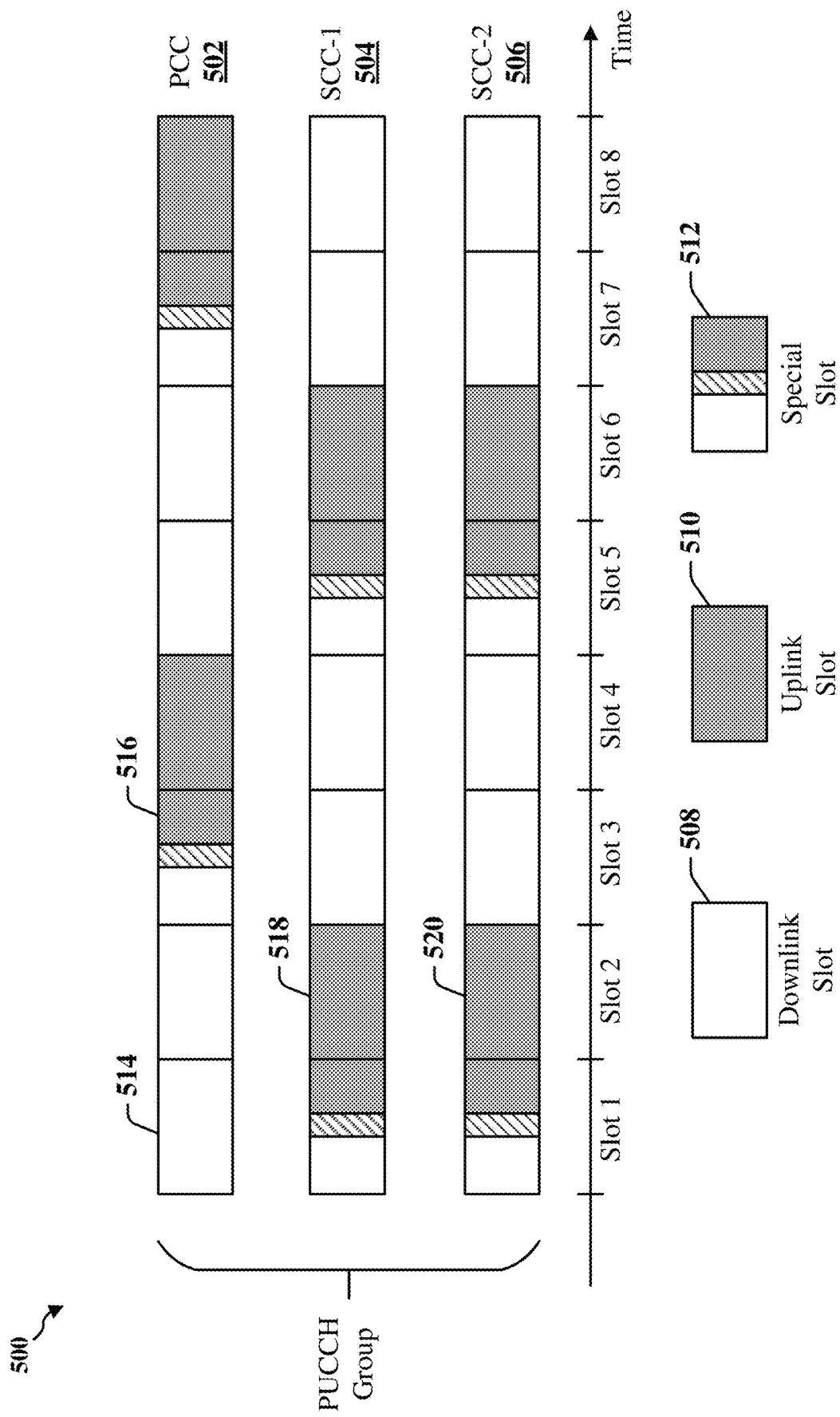
FIG. 5 illustrates an example time division duplex (TDD) configuration of a PUCCH group in accordance with aspects of the present disclosure.

FIG. 5 illustrates an example time division duplex (TDD) configuration of a PUCCH group 500. The PUCCH group 500 may include three component carriers—PCC (or PCell) 502, SCC-1 (or SCell-1) 504, and SCC-2 (or SCell-2) 506. Slots of each component carrier may be configured for a particular type of transmission (e.g., downlink transmission for uplink transmission). For example, in each component carrier, a downlink slot 508 may configured for communicating downlink transmissions and an uplink slot 510 may be configured for communicating uplink transmissions. A slot may also be configured as a special slot 512 wherein a transition from a downlink slot to an uplink slot occurs.

In FIG. 5, PCC 502 has a TDD configuration pattern different from a TDD configuration pattern of SCC-1 504 or SCC-2 506. As shown, PCC 502 has a repeating TDD configuration pattern of downlink slot-downlink slot-special slot-uplink slot (or DDSU), while SCC-1 504 and SCC-2 506 have a repeating TDD configuration pattern of special slot-uplink slot-downlink slot-downlink slot (or SUDD). Thus, PCC 502 has a staggered or complementary TDD configuration pattern as regards to SCC-1 504 and SCC-2 506 with an offset of two slots. Notably, according to the TDD configuration patterns of FIG. 5, an uplink transmission opportunity exists in at least one of the component carriers (PCC, SCC-1, or SCC-2) for every slot. Hence, a UE can transmit uplink information on at least one component carrier in each slot.

As stated above, certain communication systems (e.g., 5G NR Release 15 or Release 16) allow the UE to only transmit PUCCH on PCC, which may lead to a delay of the PUCCH transmission. For example, referring to FIG. 5, if a downlink packet is received by the UE in a first slot (downlink slot) 514 on PCC 502, then the earliest slot (earliest opportunity) for which the UE can send uplink control information (e.g., ACK/NACK feedback (PUCCH) for the downlink packet) is during an uplink portion of a third slot (special slot) 516 on PCC 502.

In an aspect, other resources (non-PCC resources) may be utilized to send the uplink control information (ACK/NACK feedback (PUCCH)) in an earlier manner That is, aspects of the disclosure provide for the UE to transmit PUCCH on SCC in addition to PCC. For example, the UE may send the uplink control information during a second slot (uplink slot) 518 on SCC-1 504 or a second slot (uplink slot) 520 on SCC-2 506. Thus, feedback for the downlink packet received in the downlink slot 514 on PCC 502 can be sent immediately in the next slot (e.g., uplink slot 518 on SCC-1 504 or uplink slot 520 on SCC-2 506). This greatly reduces the delay or latency of the uplink control information (ACK/NACK feedback), which may be useful for low latency services, e.g., ultra-reliable and low latency communications (URLLC).

In an aspect, a gNB may provide an indication to the UE of which component carrier (e.g., PCC, SCC-1, or SCC-2) to use to transmit PUCCH. In TDD uplink carrier aggregation, where all component carriers in a PUCCH group are TDD component carriers, the gNB may configure a TDD configuration pattern for the component carriers in a staggered or complementary manner. The gNB may then indicate which component carrier to use to transmit PUCCH in a slot. The gNB may indicate in a dynamic manner (dynamic indication) via a new field in downlink control information (DCI) or in a semi-static manner (semi-static indication) via a RRC configuration.

Dynamic indication via the new field in DCI may apply to PUCCH that is dynamically scheduled by DCI. For example, the gNB may use DCI to schedule a downlink transmission (e.g., physical downlink shared channel (PDSCH)), and in the same DCI, the gNB may add a new field to indicate to the UE which component carrier to send ACK/NACK (PUCCH) for the downlink transmission (PDSCH).

For other PUCCH, e.g., ACK/NACK for semi-persistent scheduling (SPS) downlink traffic or periodic channel state information (CSI) feedback, which do not utilize dynamic DCI to schedule a PUCCH transmission, the component carrier on which to send the PUCCH information may be indicated semi-statically via an RRC configuration message. The RRC configuration message may indicate a time pattern for sending the PUCCH on specific component carriers. For example, the time pattern may be as follows: For the first slot (Slot 1), PUCCH is to be transmitted on SCC-1; for the second slot (Slot 2), PUCCH is to be transmitted on SCC-2; for the third slot (Slot 3), PUCCH is to be transmitted on PCC; for the fourth slot (Slot 4), PUCCH is to be transmitted on PCC; for the fifth slot (Slot 5), PUCCH is to be transmitted on SCC-1; for the sixth slot (Slot 6), PUCCH is to be transmitted on SCC-2; for the seventh slot (Slot 7), PUCCH is to be transmitted on PCC; and for the eighth slot (Slot 8), PUCCH is to be transmitted on PCC.

Figure 6:
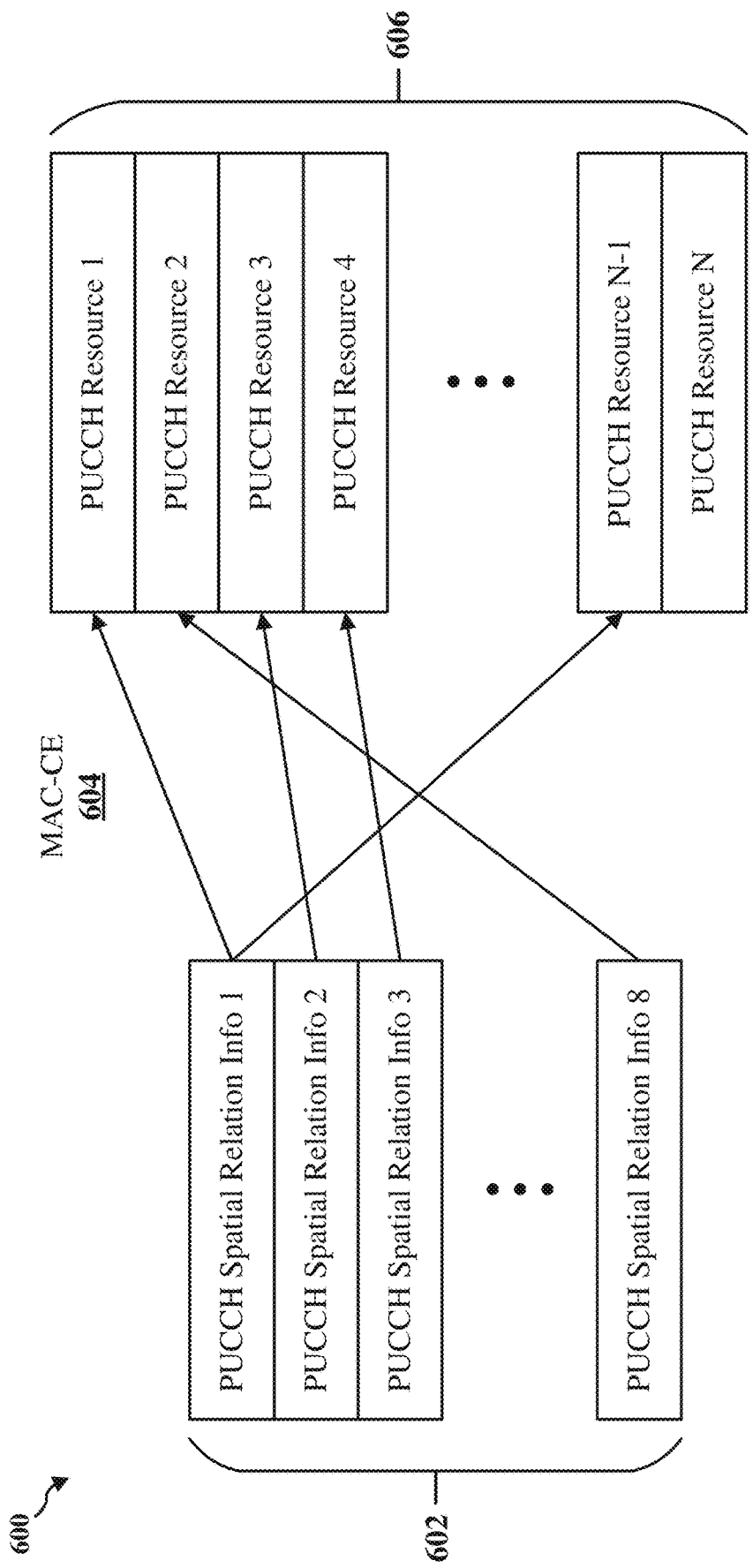
FIG. 6 illustrates an example mapping between PUCCH spatial relation information and PUCCH resources in accordance with aspects of the present disclosure.

FIG. 6 illustrates an example mapping 600 between PUCCH spatial relation information and PUCCH resources. PUCCH spatial relation information generally indicates a beam direction to transmit PUCCH. In some communication systems (e.g., 5G NR Release 15 or Release 16), PUCCH spatial relation information is configured by an RRC configuration message per uplink bandwidth part (BWP) of PCC only (e.g., if the PUCCH can only be transmitted on PCC). For a particular uplink BWP of the PCC, a gNB may configure up to eight PUCCH spatial relation information 602 (e.g., 5G NR Release 15).

In an aspect, PUCCH spatial relation information may be configured via an information element (PUCCH Spatial Relation Info IE). The PUCCH Spatial Relation Info IE may include various information, such as a PUCCH spatial relation information ID, a serving cell ID, and reference signal information. The reference signal information may configure one of three potential reference signal candidates (e.g., SSB, CSI-RS, or SRS) for PUCCH transmission. A UE may follow the beam direction of the configured reference signal to transmit PUCCH. For example, if the gNB configures SSB with index 1 in the PUCCH Spatial Relation Info IE, then the UE will utilize the same beam direction of the SSB with index 1 to transmit PUCCH. Hence, the reference signal information in the PUCCH Spatial Relation Info IE prompts the UE to transmit PUCCH using the same beam direction of the reference signal configured therein.

In an aspect, a medium access control (MAC)-control element (CE) 604 indicates to the UE which one of the eight PUCCH spatial relation information 602 to use for PUCCH transmission. The MAC-CE 604 is a special payload transmitted within a physical downlink shared channel (PDSCH). For each UE, for one uplink BWP, the gNB may configure multiple PUCCH resources (e.g., N PUCCH resources) 606. For each PUCCH resource 606, the MAC-CE 604 indicates which one of the eight spatial relation information 602 a specific PUCCH resource 606 corresponds with. Hence, the MAC-CE 604 establishes a mapping between a spatial relation information 602 and a PUCCH resource 606.

In an aspect, one PUCCH is transmitted on one PUCCH resource. For example, referring to FIG. 6, if a PUCCH is transmitted using PUCCH Resource 1, then the UE will use PUCCH Spatial Relation Info 1 to transmit PUCCH. In another example, if another PUCCH is transmitted using PUCCH Resource 3, then the UE will use PUCCH Spatial Relation Info 2 to transmit the other PUCCH. The MAC-CE 604 establishes the linkage between the different spatial relation information and the different PUCCH resources. Notably, one spatial relation information can be mapped to multiple PUCCH resources. For example, PUCCH Spatial Relation Info 1 can be mapped to PUCCH Resource 1 and PUCCH Resource N-1. However, one PUCCH resource can be mapped to only one spatial relation information. For example, PUCCH Resource 1 can only be mapped to PUCCH Spatial Relation Info 1.

Figure 7:
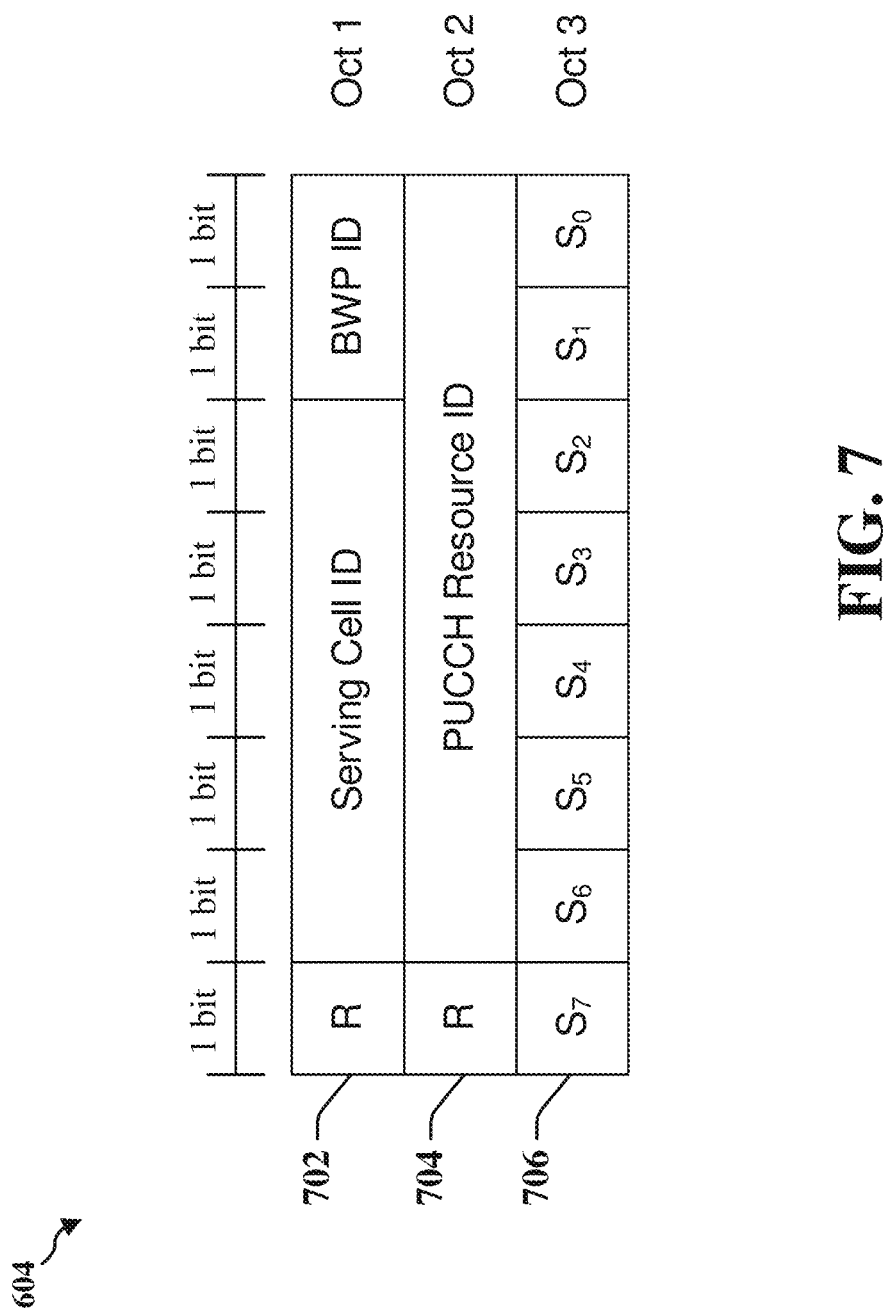
FIG. 7 illustrates an example structure of a MAC-CE transmitted in PDSCH as described with respect to FIG. 6 in accordance with aspects of the present disclosure.

FIG. 7 illustrates an example structure of a MAC-CE 604 transmitted in PDSCH as described with respect to FIG. 6. The MAC-CE 604 may be referred to as a PUCCH Spatial Relation Activation/Deactivation MAC-CE. The MAC-CE 604 may include three rows of information and each row may be divided into sections representing 1 bit. Each row includes 8 bits (octet or byte). A first row 702 may include 1 Reserved bit (R), 5 bits to represent the Serving Cell ID (identity of the serving cell for which the MAC-CE applies), and 2 bits to represent the BWP ID (identity of an uplink BWP for which the MAC-CE applies). A second row 704 may include one Reserved bit (R) and 7 bits representing a PUCCH Resource ID. A third row 706 may include an 8-bit bitmap (Si=S0, S1, . . . , S7) for which the gNB may set values.

In an aspect, the 8 bits of the third row 706 may respectively correspond to 8 different PUCCH spatial relation information (e.g., 8 PUCCH spatial relation information 602 of FIG. 6). Accordingly, if the gNB sets one of the bits in the third row 706 to 1 (Si=1), then a corresponding PUCCH spatial relation information (e.g., PUCCH Spatial Relation Info i+1 of FIG. 6) may be activated. Alternatively, if the gNB sets one of the bits in the third row 706 to 0 (Si=0), then a corresponding PUCCH spatial relation information (e.g., PUCCH Spatial Relation Info i+1 of FIG. 6) may be deactivated. For example, if i=0, then Si is S0 and the gNB sets S0 to 1. Accordingly, when S0 is 1, the PUCCH Spatial Relation Info i+1 (PUCCH Spatial Relation Info 1 of FIG. 6) is activated. Moreover, the gNB sets the rest of the bits (S1 to S7) in the third row 706 to 0 causing the corresponding Spatial Relation Info 2 to 8 of FIG. 6 to be deactivated.

Figure 8:
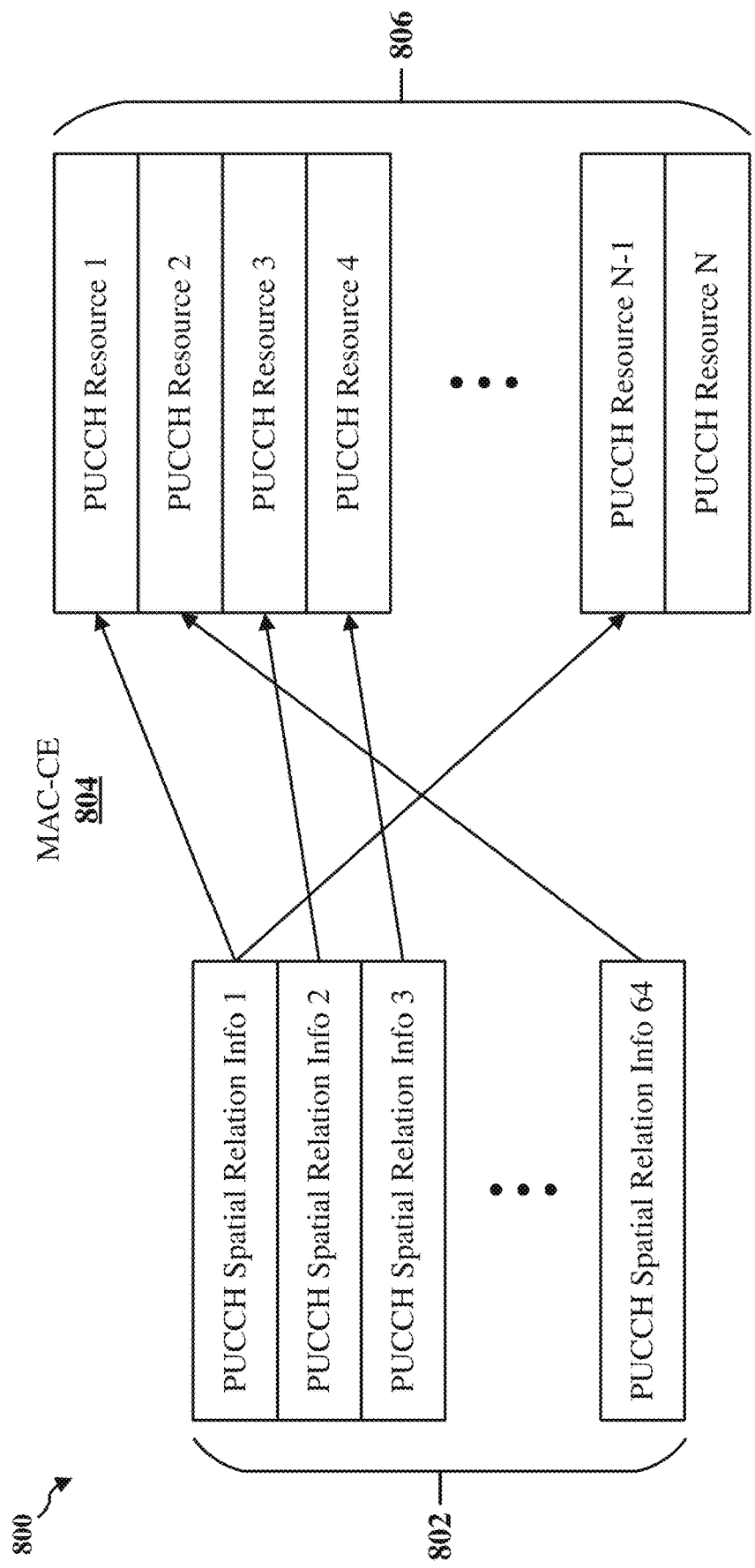
FIG. 8 illustrates another example mapping between PUCCH spatial relation information and PUCCH resources in accordance with aspects of the present disclosure.

FIG. 8 illustrates another example mapping 800 between PUCCH spatial relation information and PUCCH resources. As stated above, in some communication systems (e.g., 5G NR Release 15 or Release 16), PUCCH spatial relation information is configured by an RRC configuration message per uplink bandwidth part (BWP) of PCC only (e.g., if the PUCCH can only be transmitted on PCC). As shown in FIG. 8, for a particular uplink BWP of the PCC, a gNB may configure up to 64 PUCCH spatial relation information 802 (e.g., 5G NR Release 16).

Similar to the MAC-CE 604 (of FIG. 6) described above, a MAC-CE 804 is a special payload transmitted within PDSCH that indicates to the UE which one of the 64 PUCCH spatial relation information 802 to use for PUCCH transmission. For each UE, for one uplink BWP, the gNB may configure multiple PUCCH resources (e.g., N PUCCH resources) 806. For each PUCCH resource 806, the MAC-CE 804 indicates which one of the 64 spatial relation information 802 a specific PUCCH resource 806 corresponds with. Hence, the MAC-CE 804 establishes a mapping between a spatial relation information 802 and a PUCCH resource 806.

In an aspect, one PUCCH is transmitted on one PUCCH resource. For example, referring to FIG. 8, if a PUCCH is transmitted using PUCCH Resource 1, then the UE will use PUCCH Spatial Relation Info 1 to transmit PUCCH. In another example, if another PUCCH is transmitted using PUCCH Resource 2, then the UE will use PUCCH Spatial Relation Info 64 to transmit the other PUCCH. The MAC-CE 804 establishes the linkage between the different spatial relation information and the different PUCCH resources. Notably, one spatial relation information can be mapped to multiple PUCCH resources. For example, PUCCH Spatial Relation Info 1 can be mapped to PUCCH Resource 1 and PUCCH Resource N-1. However, one PUCCH resource can be mapped to only one spatial relation information. For example, PUCCH Resource 1 can only be mapped to PUCCH Spatial Relation Info 1.

Referring back to FIGS. 6 and 7, the MAC-CE 604 may only map one linkage between a PUCCH resource and a PUCCH spatial relation information at a time since the MAC-CE 604 can only hold one PUCCH Resource ID. If multiple PUCCH resources are to be linked to PUCCH spatial relation information, then multiple MAC-CEs 604 would have to be transmitted. In an aspect, as will be described below, one MAC-CE (e.g., the MAC-CE 804) may map PUCCH spatial relation information to a group of PUCCH resources (multiple PUCCH resources) on PCC, thus eliminating the need to transmit multiple MAC-CEs for multiple PUCCH resources.

Figure 9:
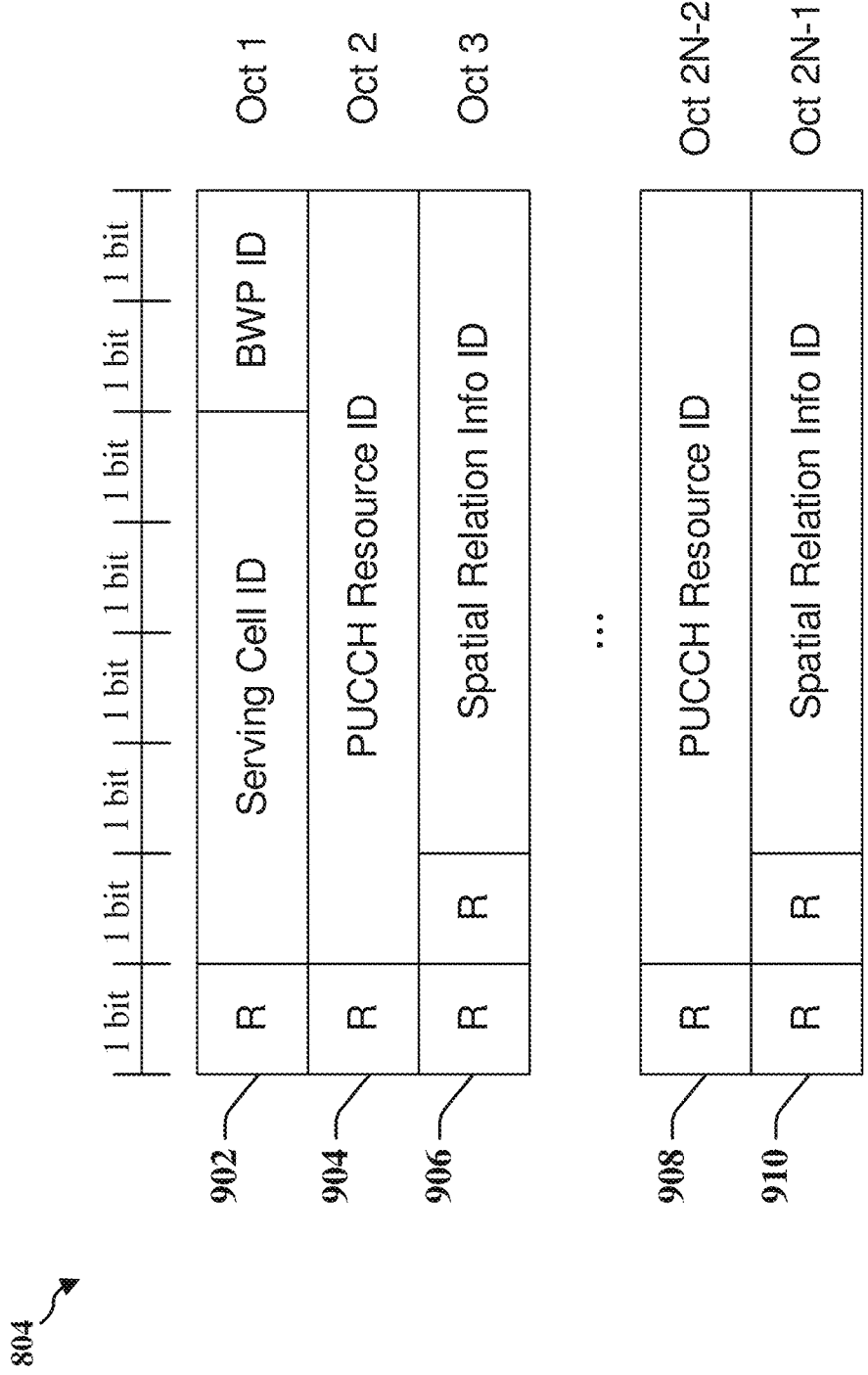
FIG. 9 illustrates an example structure of a MAC-CE transmitted in PDSCH as described with respect to FIG. 8 in accordance with aspects of the present disclosure.

FIG. 9 illustrates an example structure of a MAC-CE 804 transmitted in PDSCH as described with respect to FIG. 8. The MAC-CE 804 may include multiple rows of information and each row may be divided into sections representing 1 bit. Each row includes 8 bits (octet or byte). A first row 902 may include 1 Reserved bit (R), 5 bits to represent the Serving Cell ID (identity of the serving cell for which the MAC-CE applies), and 2 bits to represent the BWP ID (identity of an uplink BWP for which the MAC-CE applies). A second row 904 may include one Reserved bit (R) and 7 bits representing a PUCCH Resource ID. In a third row 906, instead of containing an 8-bit bitmap for which a gNB may set values as in the MAC-CE 604 of FIG. 7, the MAC-CE 804 includes 2 Reserved bits (R) and 6 bits directly representing a PUCCH Spatial Relation Info ID (e.g., one of PUCCH Spatial Relation Info 1 to 64 of FIG. 8) that corresponds to the PUCCH Resource ID indicated in the second row 804. The MAC-CE 804 repeats the second row 904 and the third row 906 for each subsequent PUCCH Resource ID and PUCCH Spatial Relation Info ID, as shown in row 908 and row 910, respectively. Notably, the first row 902 is not repeated since the Serving Cell ID and the BWP ID are common for all PUCCH Resource IDs.

Figure 10:
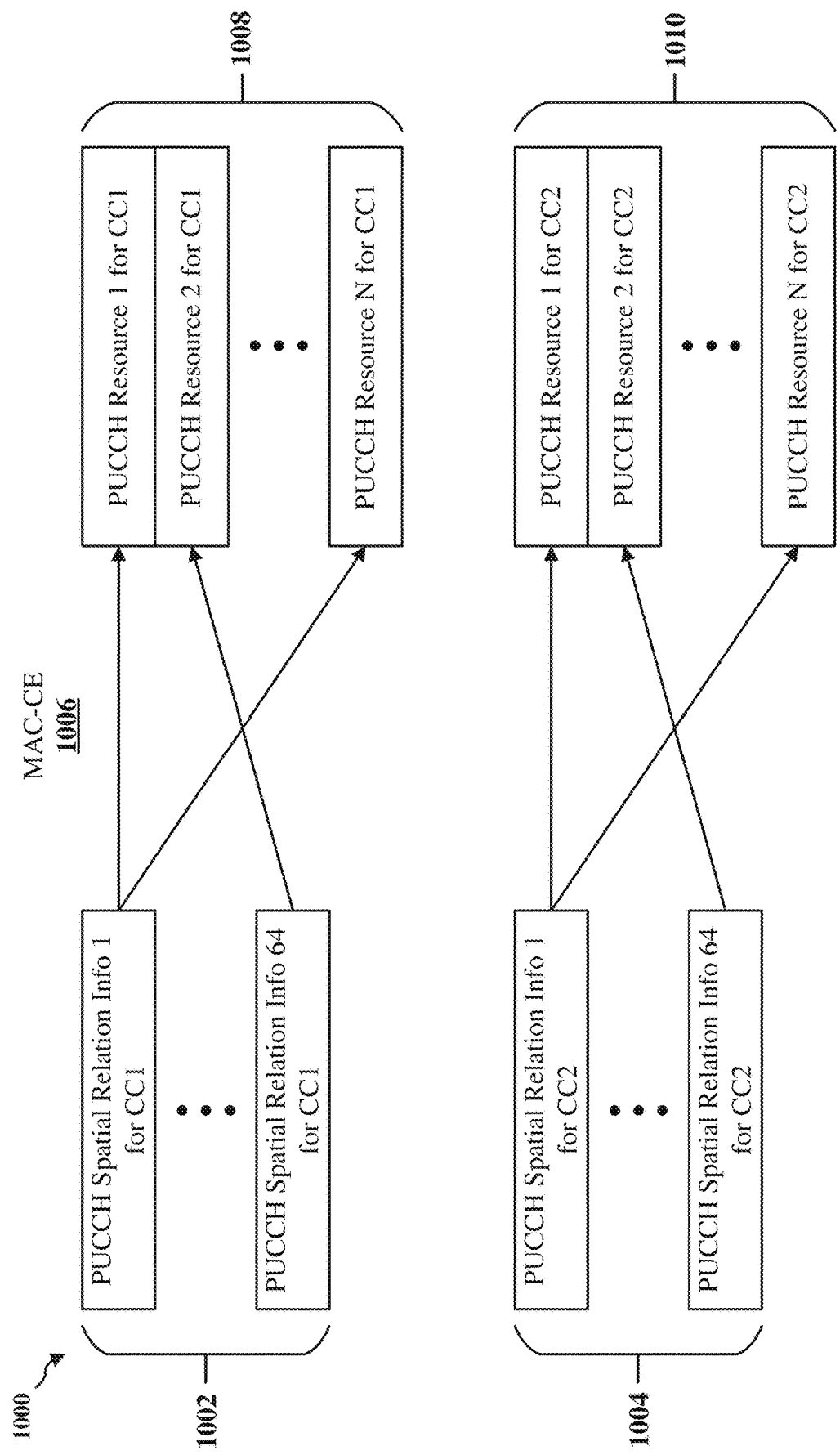
FIG. 10 illustrates an example mapping between PUCCH spatial relation information and PUCCH resources across multiple component carriers in accordance with aspects of the present disclosure.

FIG. 10 illustrates an example mapping 1000 between PUCCH spatial relation information and PUCCH resources across multiple component carriers. Aspects of the disclosure provide for transmitting PUCCH on all component carriers in a PUCCH group. Thus, PUCCH can be transmitted on PCC (or PCell) and one or more SCCs (or SCells). Accordingly, an RRC configuration message may configure PUCCH spatial relation information per uplink bandwidth part (BWP) for all cells (including PCC and SCC) in the PUCCH group.

A gNB may configure up to 64 PUCCH spatial relation information for each cell (e.g., PCC, SCC-1, and SCC-2) in the PUCCH group. As shown in FIG. 10, a first PUCCH spatial relation information configuration 1002 configures 64 PUCCH spatial relation information for a first component carrier (CC1), e.g., PCC. Moreover, a second PUCCH spatial relation information configuration 1004 configures 64 PUCCH spatial relation information for a second component carrier (CC2), e.g. SCC-1. Although only two PUCCH spatial relation information configurations 1002 and 1004 are respectively shown for two component carriers CC1 and CC2 in FIG. 10, it is contemplated that other PUCCH spatial relation information configurations (having up to 64 PUCCH spatial relation information) may be configured for other component carriers (e.g., SCC-2 or other SCCs) in the PUCCH group. In an aspect, the contents of a spatial relation information configuration (e.g., first configuration 1002 for CC1 (PCC)) may be different from the contents of another spatial relation information configuration (e.g., second configuration 1004 for CC2 (SCC-1). In a further aspect, how each configuration is specifically configured may be dependent on the gNB.

Still referring to FIG. 10, a MAC-CE 1006 is a special payload transmitted within PDSCH that establishes a mapping between PUCCH spatial relation information and a group of PUCCH resources (multiple PUCCH resources) across multiple component carriers. In one aspect, one MAC-CE 1006 may be used to indicate to the UE, for each component carrier, which one of the various PUCCH spatial relation information in a configuration corresponding to a respective component carrier to use for PUCCH transmission on the respective component carrier. For example, the MAC-CE 1006 may indicate for CC1 (PCC) which one of the 64 PUCCH spatial relation information in the first configuration 1002 to use for PUCCH transmission. The same MAC-CE 1006 may also indicate for CC2 (SCC-1) which one of the 64 PUCCH spatial relation information in the second configuration 1004 to use for PUCCH transmission.

In another aspect, separate MAC-CEs (transmitted in separate PDSCHs) may be used to establish the mapping for each component carrier. For example, one MAC-CE may indicate for CC1 (PCC) which one of the 64 PUCCH spatial relation information in the first configuration 1002 to use for PUCCH transmission, and another MAC-CE may indicate for CC2 (SCC-1) which one of the 64 PUCCH spatial relation information in the second configuration 1004 to use for PUCCH transmission.

For each component carrier, the gNB may also configure multiple PUCCH resources (e.g., N PUCCH resources). For example, a first set of PUCCH resources 1008 may be configured for CC1 (PCC) and a second set of PUCCH resources 1010 may be configured for CC2 (SCC-1). Although only two sets of PUCCH resources 1008 and 1010 are respectively shown for two component carriers CC1 and CC2 in FIG. 10, it is contemplated that other sets of PUCCH resources (having N PUCCH resources) may be configured for other component carriers (e.g., SCC-2 or other SCCs) in the PUCCH group.

For each PUCCH resource in a set of PUCCH resources configured for a component carrier, the MAC-CE 1006 indicates which one of the various PUCCH spatial relation information in a configuration (corresponding to the component carrier) a specific PUCCH resource relates to. For example, the MAC-CE 1006 indicates for CC1 (PCC) which one of the 64 PUCCH spatial relation information in the first configuration 1002 corresponds with a specific PUCCH resource in the first set of PUCCH resources 1008. The MAC-CE 1006 also indicates for CC2 (SCC-1) which one of the 64 PUCCH spatial relation information in the second configuration 1004 corresponds with a specific PUCCH resource in the second set of PUCCH resources 1010. Although not shown, it is contemplated that the MAC-CE 1006 also indicates for another component carrier (e.g., SCC-2 or other SCCs) which one of various PUCCH spatial relation information configured for the other carrier corresponds with a specific PUCCH resource in a set of PUCCH resources configured for the other carrier.

Figure 11:
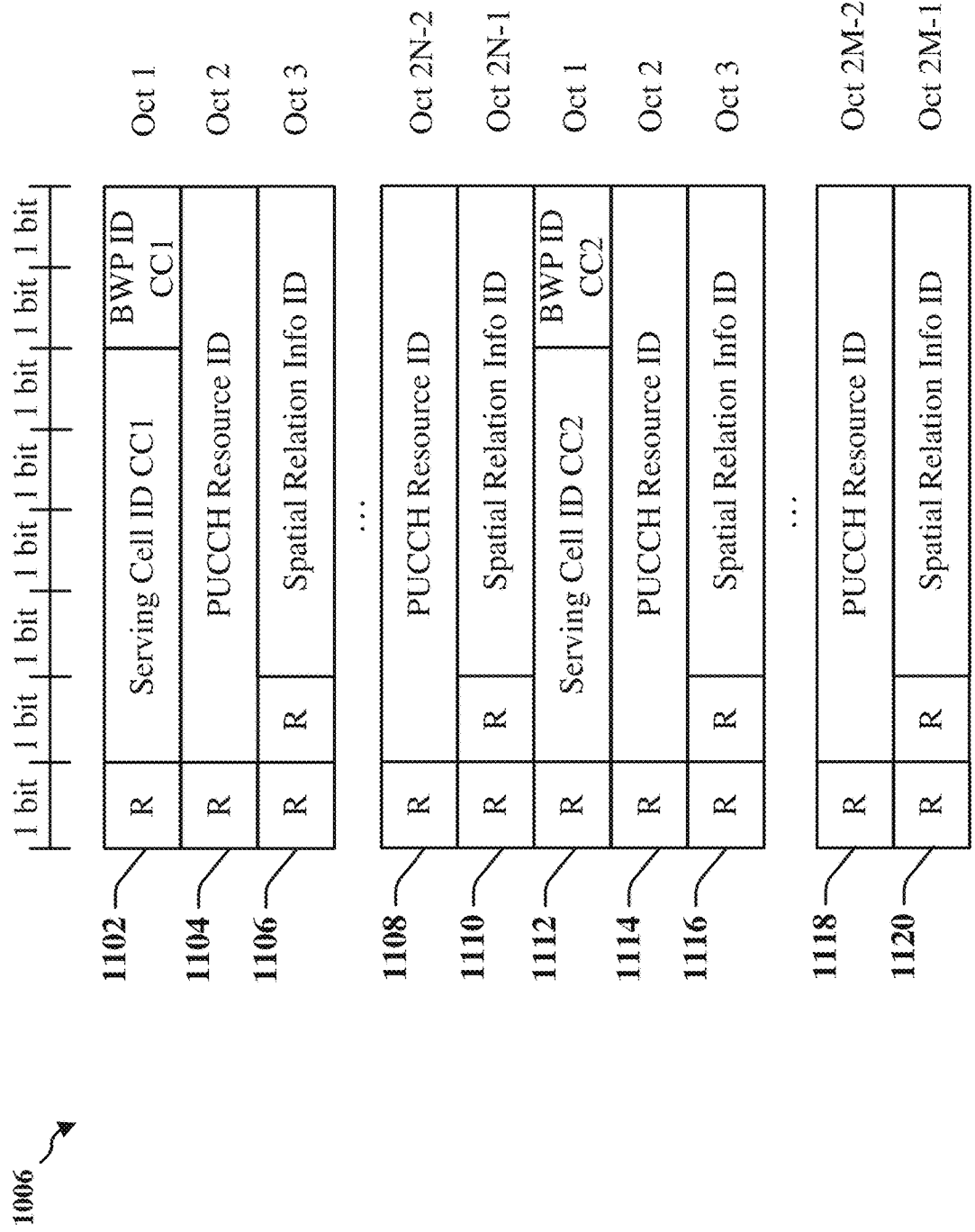
FIG. 11 illustrates an example structure of a MAC-CE transmitted in PDSCH as described with respect to FIG. 10 in accordance with aspects of the present disclosure.

FIG. 11 illustrates an example structure of a MAC-CE 1006 transmitted in PDSCH as described with respect to FIG. 10. The MAC-CE 1006 may include multiple rows of information and each row may be divided into sections representing 1 bit. Each row includes 8 bits (octet or byte). A first set of rows may include information pertaining to the first component carrier (CC1), e.g., PCC, in the PUCCH group. For example, a first row 1102 may include 1 Reserved bit (R), 5 bits to represent a Serving Cell ID of CC1, and 2 bits to represent a BWP ID of CC1. A second row 1104 may include one Reserved bit (R) and 7 bits representing a PUCCH Resource ID (e.g., identity of one of the N PUCCH resources in the first set of PUCCH resources 1008 in FIG. 10). A third row 1106 may include 2 Reserved bits (R) and 6 bits directly representing a PUCCH Spatial Relation Info ID (e.g., identity of one of the 64 PUCCH spatial relation information in the first configuration 1002 in FIG. 10) that corresponds to the PUCCH Resource ID indicated in the second row 1104. The MAC-CE 1006 repeats the second row 1104 and the third row 1106 for each subsequent PUCCH Resource ID and PUCCH Spatial Relation Info ID corresponding to CC1, as shown in row 1108 and row 1110, respectively.

The MAC-CE 1006 may further include additional sets of rows containing information pertaining to other component carriers in the PUCCH group. For example, a second set of rows may include information pertaining to the second component carrier (CC2), e.g., SCC-1. As shown, a row 1112 may include 1 Reserved bit (R), 5 bits to represent a Serving Cell ID of CC2, and 2 bits to represent a BWP ID of CC2. A row 1114 may include one Reserved bit (R) and 7 bits representing a PUCCH Resource ID (e.g., identity of one of the N PUCCH resources in the second set of PUCCH resources 1010 in FIG. 10). A row 1116 may include 2 Reserved bits (R) and 6 bits directly representing a PUCCH Spatial Relation Info ID (e.g., identity of one of the 64 PUCCH spatial relation information in the second configuration 1004 in FIG. 10) that corresponds to the PUCCH Resource ID indicated in the row 1114. The MAC-CE 1006 repeats the row 1114 and the third row 1116 for each subsequent PUCCH Resource ID and PUCCH Spatial Relation Info ID corresponding to CC2, as shown in row 1118 and row 1120, respectively. Although not shown, it is contemplated that the MAC-CE 1006 may also include additional sets of rows containing information (e.g., Serving Cell ID, BWP ID, PUCCH Resource ID, and Spatial Relation Info ID) pertaining to other component carriers (e.g., SCC-2 or other SCCs) in the PUCCH group.

Figure 12:
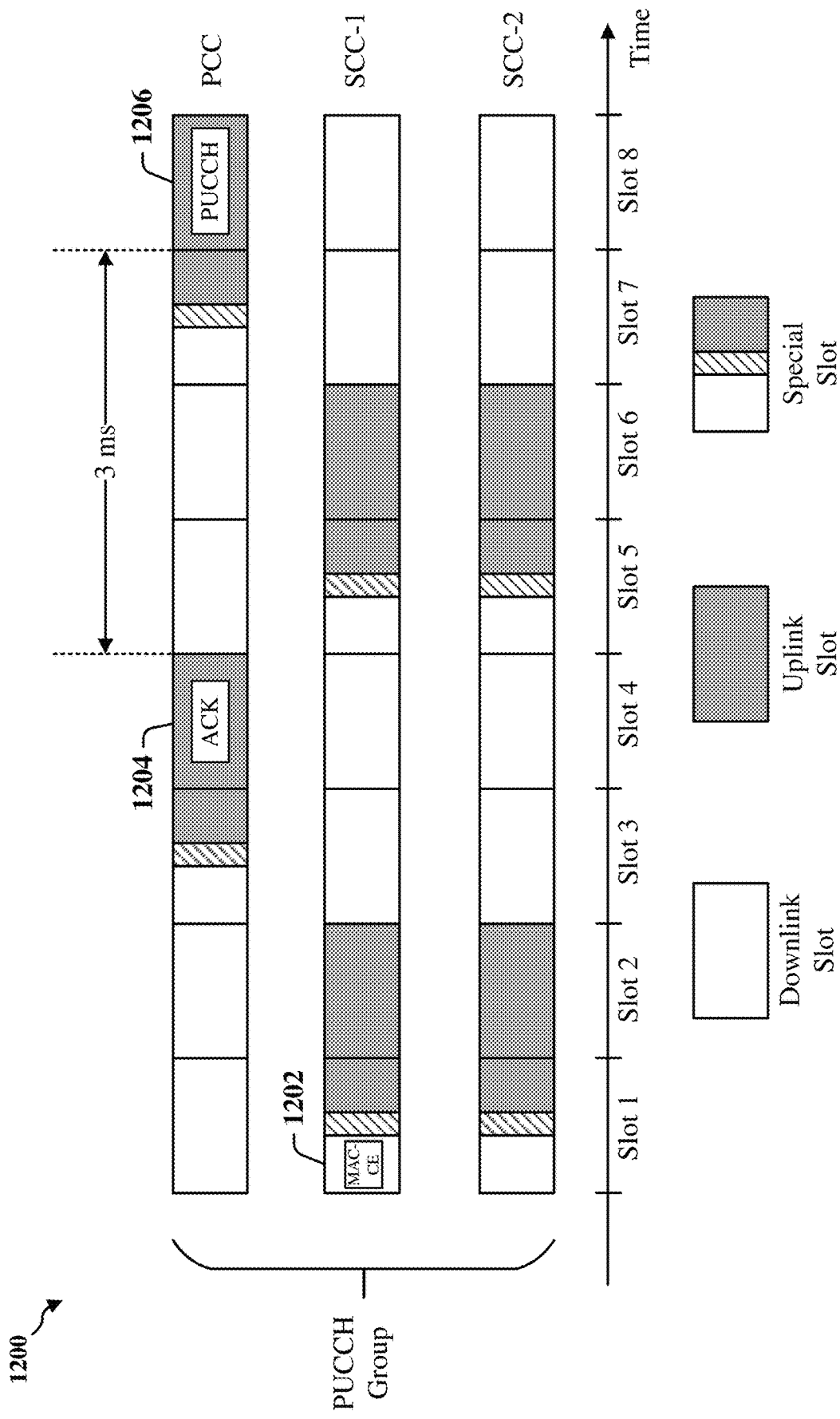
FIG. 12 is an example timeline for applying PUCCH spatial relation information to transmit PUCCH in accordance with aspects of the present disclosure.

FIG. 12 is an example timeline 1200 for applying PUCCH spatial relation information to transmit PUCCH. In FIG. 12, it is assumed that PUCCH can only be transmitted on PCC in a PUCCH group. In an example operation, a UE may receive MAC-CE via PDSCH from a gNB during an uplink portion of a special slot 1202 on SCC-1. Thereafter, the UE may send ACK to the gNB during an uplink slot 1204 on PCC to acknowledge that the PDSCH (including MAC-CE) previously received during the special slot 1202 on SCC-1 was correctly decoded.

Upon passage of a threshold amount of time (e.g., 3 milliseconds (ms)) after the end of the slot (e.g., slot 1204) in which ACK was sent, the UE may apply the PUCCH spatial relation information indicated in the MAC-CE to send PUCCH on PCC. For example, 3 ms after the end of the slot 1204 in which ACK was sent, the UE may apply the PUCCH spatial relation information indicated in the MAC-CE to send PUCCH to the gNB during an uplink slot 1206 on PCC. The PUCCH spatial relation information may include information regarding a beam direction in which PUCCH is to be sent. Moreover, the PUCCH spatial relation information may be mapped to a specific PUCCH resource on PCC to be used for sending PUCCH. In an aspect, the gNB may assume that the UE will apply the PUCCH spatial relation information indicated in the MAC-CE to send PUCCH on PCC after the threshold amount of time (e.g., 3 ms) has passed after the end of the slot (e.g., slot 1204) in which ACK was received by the gNB. Conversely, the UE may assume that the gNB will apply the PUCCH spatial relation information indicated in the MAC-CE to receive PUCCH on PCC after the threshold amount of time (e.g., 3 ms) has passed after the end of the slot (e.g., slot 1204) in which ACK was sent by the UE.

Figure 13:
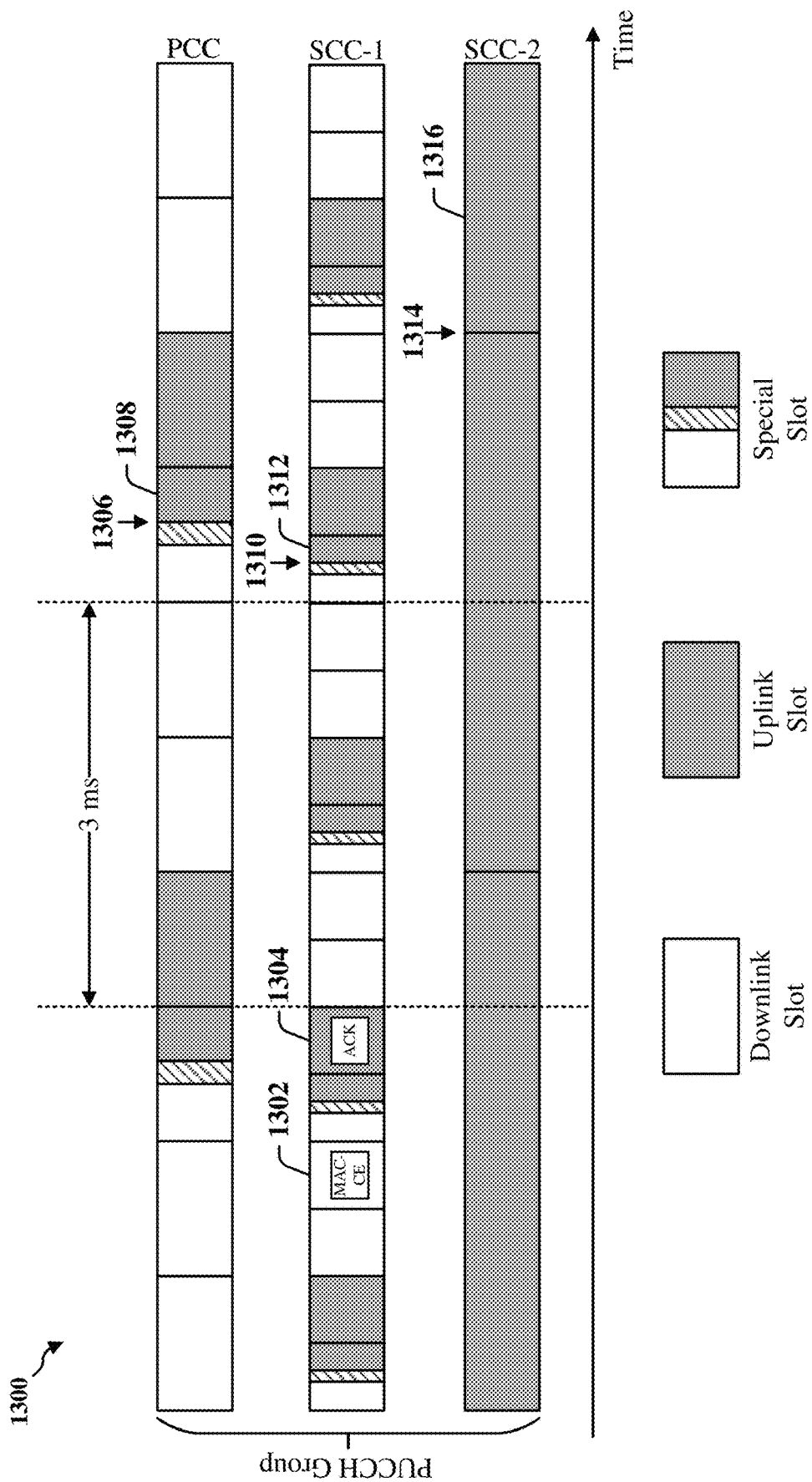
FIG. 13 is another example timeline 1300 for applying PUCCH spatial relation information to transmit PUCCH in accordance with aspects of the present disclosure.

FIG. 13 is another example timeline 1300 for applying PUCCH spatial relation information to transmit PUCCH. In FIG. 13, it is assumed that PUCCH can be transmitted on any component carrier (e.g., any of PCC, SCC-1, or SCC-2) in a PUCCH group. In an example operation, a UE may receive MAC-CE via PDSCH from a gNB during a downlink slot 1302 on SCC-1. Thereafter, the UE may send ACK to the gNB during an uplink slot 1304 on SCC-1 to acknowledge that the PDSCH (including MAC-CE) previously received during the downlink slot 1302 on SCC-1 was correctly decoded.

Upon passage of a threshold amount of time (e.g., 3 ms) after the end of the slot (e.g., slot 1304) in which ACK was sent, the UE may apply the PUCCH spatial relation information indicated in the MAC-CE to send PUCCH on all component carriers (e.g., PCC, SCC-1, and SCC-2). In an aspect, for each component carrier, the UE applies the PUCCH spatial relation information at a next uplink transmission slot boundary after the passage of the threshold amount of time. For example, for PCC, the UE applies the PUCCH spatial relation information indicated in the MAC-CE at an uplink transmission slot boundary 1306 to send PUCCH to the gNB during a slot 1308. For SCC-1, the UE applies the PUCCH spatial relation information indicated in the MAC-CE at an uplink transmission slot boundary 1310 to send PUCCH to the gNB during a slot 1312. For SCC-2, the UE applies the PUCCH spatial relation information indicated in the MAC-CE at an uplink transmission slot boundary 1314 to send PUCCH to the gNB during a slot 1316.

The PUCCH spatial relation information may include information regarding a beam direction in which PUCCH is to be sent. Moreover, the PUCCH spatial relation information may be mapped to a specific PUCCH resource on each of the component carriers PCC, SCC-1, and SCC-2 to be used for sending PUCCH. In an aspect, the gNB may assume that the UE will apply the PUCCH spatial relation information indicated in the MAC-CE to send PUCCH on PCC, SCC-1, or SCC-2 at the next uplink transmission slot boundary after the threshold amount of time (e.g., 3 ms) has passed after the end of the slot (e.g., slot 1304) in which ACK was received by the gNB. Conversely, the UE may assume that the gNB will apply the PUCCH spatial relation information indicated in the MAC-CE to receive PUCCH on PCC, SCC-1, or SCC-2 at the next uplink transmission slot boundary after the threshold amount of time (e.g., 3 ms) has passed after the end of the slot (e.g., slot 1304) in which ACK was sent by the UE.

Aspects of the disclosure also provide for fallback PUCCH spatial relation information. In an aspect, for a case where PUCCH can only be transmitted on PCC in a PUCCH group and PUCCH spatial relation information for transmitting PUCCH on PCC is not configured (e.g., via an RRC configuration message), the UE may use fallback spatial relation information to transmit PUCCH. For example, the fallback spatial relation information for transmitting PUCCH on PCC may be the spatial setting for receiving PDCCH by the UE in a control resource set (CORESET) having the lowest CORESET ID on the active downlink BWP of the PCC.

In another aspect, for a case where PUCCH can be transmitted on any component carrier in a PUCCH group (e.g., PCC, SCC-1, or SCC-2) and PUCCH spatial relation information for transmitting PUCCH on SCC is not configured (e.g., via an RRC configuration message), the UE may use fallback spatial relation information to transmit PUCCH. For example, the fallback spatial relation information for transmitting PUCCH on SCC may be determined as follows: 1) If the SCC has a CORESET configured for monitoring PDCCH, the fallback spatial relation information for transmitting PUCCH on SCC is the spatial setting for receiving PDCCH by the UE having the lowest CORESET ID on the active downlink BWP of the SCC; 2) Otherwise, the fallback spatial relation information for transmitting PUCCH on SCC is the spatial setting for receiving PDCCH by the UE having the lowest CORESET ID on the active downlink BWP of the PCC.

In a further aspect, for the case where PUCCH can be transmitted on any component carrier in a PUCCH group (e.g., PCC, SCC-1, or SCC-2) and PUCCH spatial relation information for transmitting PUCCH on SCC is not configured (e.g., via an RRC configuration message), the UE may determine the fallback spatial relation information for transmitting PUCCH on SCC as follows: 1) If the SCC has a CORESET configured for monitoring PDCCH, the fallback spatial relation information for transmitting PUCCH on SCC is the spatial setting for receiving PDCCH by the UE having the lowest CORESET ID on the active downlink BWP of the SCC; 2) Otherwise, the fallback spatial relation information for transmitting PUCCH on SCC is the spatial setting for an activated physical downlink shared channel (PDSCH) transmission configuration indicator (TCI) state having the lowest TCI state ID on the SCC.

Figure 14:
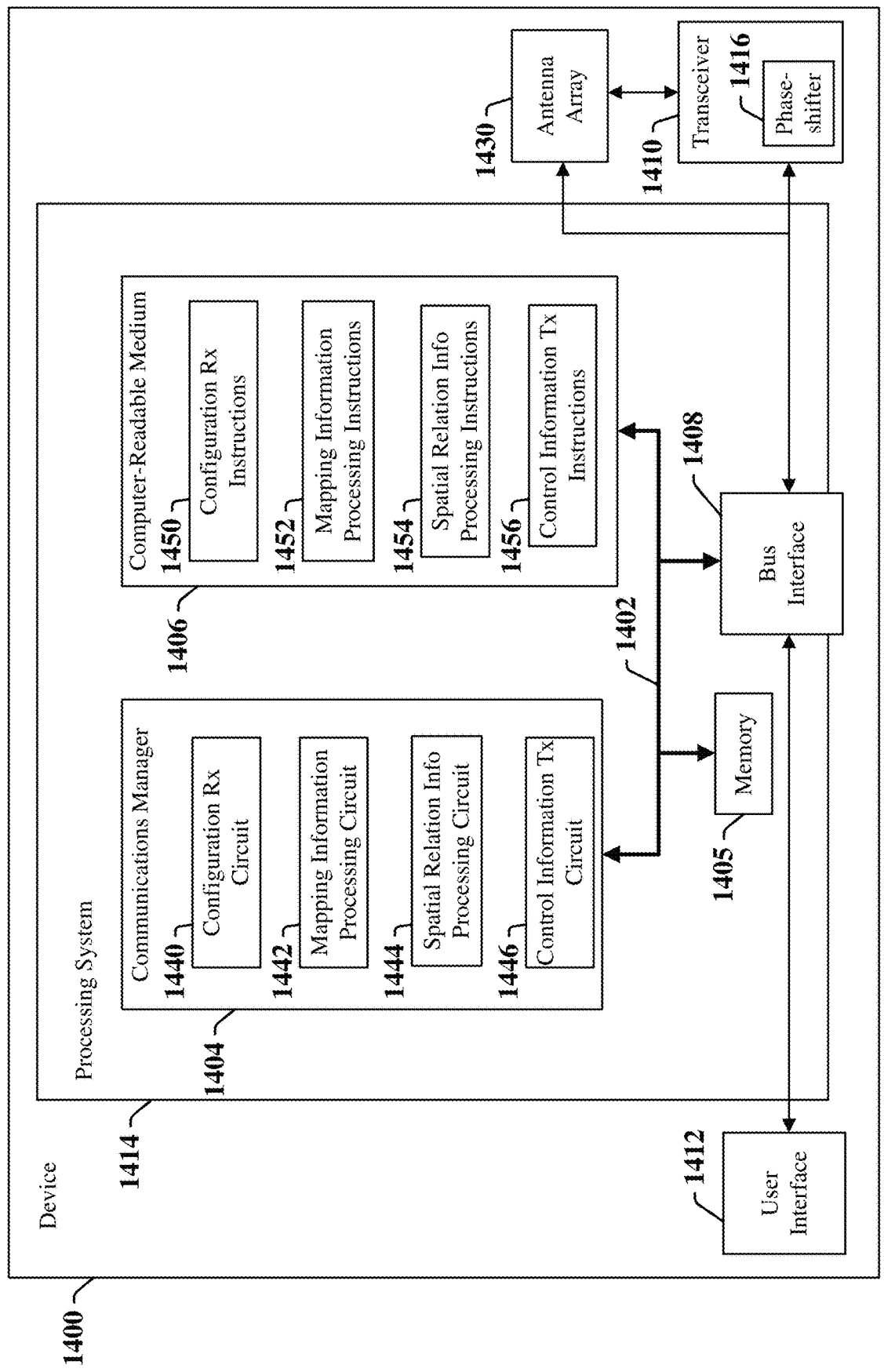
FIG. 14 is a block diagram illustrating an example of a hardware implementation for an exemplary device employing a processing system in accordance with aspects of the present disclosure.

FIG. 14 is a block diagram illustrating an example of a hardware implementation for an exemplary device 1400 employing a processing system 1414. For example, the device 1400 may be a receiving device or UE, as illustrated in any one or more of FIGS. 1 and 3. The device 1400 may be implemented with a processing system 1414 that includes one or more processors 1404 (e.g., communications manager). Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the device 1400 may be configured to perform any one or more of the functions described herein. That is, the processor 1404, as utilized in a device 1400, may include the UE communications manager 198/398 and used to implement any one or more of the processes and procedures described below and illustrated in FIG. 15.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium. In some examples, the transceiver 1410 may include a phase-shifter 1416 for digital and/or analog beamforming via one or more antenna array(s) 1430. Depending upon the nature of the apparatus, a user interface 1412 (e.g., keypad, display, speaker, microphone, joystick) may also be provided. Of course, such a user interface 1412 is optional, and may be omitted in some examples, such as a base station.

In some aspects of the disclosure, the processor 1404 (e.g., UE communications manager 198/398) may include configuration receiving circuitry 1440 configured for various functions, including, for example, receiving configuration information from a second device, the configuration information including an indication to transmit uplink control information via a primary component carrier (PCC) or a given secondary component carrier (SCC) of at least one SCC in a slot. For example, the configuration receiving circuitry 1440 may be configured to implement one or more of the functions described below in relation to FIG. 15, including, e.g., block 1502. The processor 1404 may also include mapping information processing circuitry 1442 configured for various functions, including, for example, receiving mapping information from the second device, wherein the mapping information indicates an enabled spatial relation information configured for the PCC or the given SCC for transmitting the uplink control information. For example, the mapping information processing circuitry 1442 may be configured to implement one or more of the functions described below in relation to FIG. 15, including, e.g., block 1504. The processor 1404 may also include spatial relation information processing circuitry 1444 configured for various functions, including, for example, identifying an enabled spatial relation information configured for the PCC or the given SCC based on the mapping information. For example, the spatial relation information processing circuitry 1444 may be configured to implement one or more of the functions described below in relation to FIG. 15, including, e.g., block 1508. The processor 1404 may also include control information transmitting circuitry 1446 configured for various functions, including, for example, transmitting an acknowledgement ACK message to the second device in an uplink slot to acknowledge that the mapping information was correctly received and transmitting, to the second device, the uplink control information on the PCC or the given SCC in the slot based on the indication included in the configuration information, the enabled spatial relation information, and an uplink resource mapped to the enabled spatial relation information. For example, the control information transmitting circuitry 1446 may be configured to implement one or more of the functions described below in relation to FIG. 15, including blocks 1506 and 1510.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406. The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1406 may include configuration receiving instructions 1450 configured for various functions, including, for example, receiving configuration information from a second device, the configuration information including an indication to transmit uplink control information via a primary component carrier (PCC) or a given secondary component carrier (SCC) of at least one SCC in a slot. For example, the configuration receiving instructions 1450 may be configured to implement one or more of the functions described below in relation to FIG. 15, including, e.g., block 1502. The computer-readable storage medium 1406 may also include mapping information processing instructions 1452 configured for various functions, including, for example, receiving mapping information from the second device, wherein the mapping information indicates an enabled spatial relation information configured for the PCC or the given SCC for transmitting the uplink control information. For example, the mapping information processing instructions 1452 may be configured to implement one or more of the functions described below in relation to FIG. 15, including, e.g., block 1504. The computer-readable storage medium 1406 may also include spatial relation information processing instructions 1454 configured for various functions, including, for example, identifying an enabled spatial relation information configured for the PCC or the given SCC based on the mapping information. For example, the spatial relation information processing instructions 1454 may be configured to implement one or more of the functions described below in relation to FIG. 15, including, e.g., block 1508. The computer-readable storage medium 1406 may also include control information transmitting instructions 1456 configured for various functions, including, for example, transmitting an acknowledgement (ACK) message to the second device in an uplink slot to acknowledge that the mapping information was correctly received and transmitting, to the second device, the uplink control information on the PCC or the given SCC in the slot based on the indication included in the configuration information, the enabled spatial relation information, and an uplink resource mapped to the enabled spatial relation information. For example, the control information transmitting instructions 1456 may be configured to implement one or more of the functions described below in relation to FIG. 15, including blocks 1506 and 1510.

Figure 15:
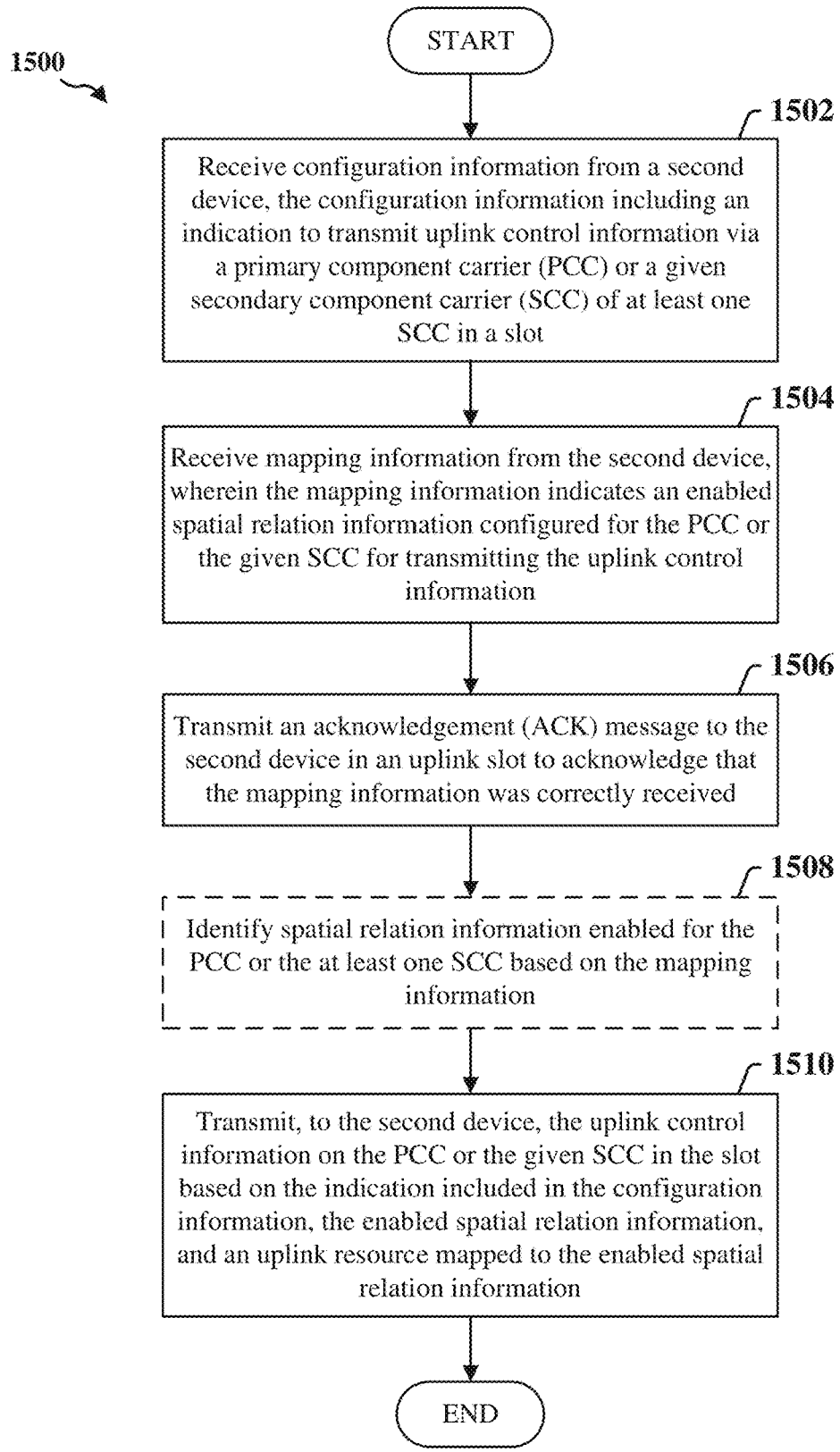
FIG. 15 is a flow chart illustrating an exemplary process for communicating uplink control information in accordance with aspects of the present disclosure.

FIG. 15 is a flow chart illustrating an exemplary process 1500 for communicating uplink control information (e.g., PUCCH) in accordance with aspects of the present disclosure. As described below, some or all illustrated features may be omitted in a particular implementation within the scope of the present disclosure, and some illustrated features may not be required for implementation of all aspects. In some examples, the process 1500 may be carried out by the device 1400 illustrated in FIG. 14, which may be a UE, as illustrated in any one or more of FIGS. 1 and 3. In some examples, the process 1500 may be carried out by any suitable apparatus or means for carrying out the functions or algorithm described below.

At block 1502, the device receives configuration information from a second device (e.g., gNB). The configuration information includes an indication to transmit uplink control information via a primary component carrier (PCC) or a given secondary component carrier (SCC) of at least one SCC in a slot. In an aspect, the uplink control information is a physical uplink control channel (PUCCH). Moreover, the configuration information may be received via downlink control information (DCI) or a radio resource control (RRC) configuration message.

At block 1504, the device receives mapping information from the second device. In an aspect, the mapping information is received via a medium access control (MAC)-control element (CE) in a physical downlink shared channel (PDSCH). The mapping information may include an identification of one or more first uplink resources (e.g., first PUCCH resources) in the PCC configured for transmitting the uplink control information and an identification of one or more first spatial relation information (e.g., first PUCCH spatial relation information) configured for the PCC respectively mapped to the one or more first uplink resources in the PCC. The mapping information may further include for each of the at least one SCC, an identification of one or more second uplink resources (e.g., second PUCCH resources) in a respective SCC configured for transmitting the uplink control information and an identification of one or more second spatial relation information (e.g., second PUCCH spatial relation information) configured for the respective SCC respectively mapped to the one or more second uplink resources in the respective SCC. The mapping information may also indicate an enabled spatial relation information of the one or more first spatial relation information or the one or more second spatial relation information configured for the PCC or the given SCC for transmitting the uplink control information.

In an aspect, the one or more first spatial relation information and the one or more second spatial relation information indicate a beam direction for transmitting the uplink control information based on a configured reference signal (e.g., SSB, CSI-RS, or SRS).

At block 1506, the device transmits an acknowledgement (ACK) message to the second device in an uplink slot to acknowledge that the mapping information was correctly received. At block 1508, the device identifies the enabled spatial relation information configured for the PCC or the given SCC based on the mapping information.

At block 1510, the device transmits, to the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information. In an aspect, the device transmitting the uplink control information includes the device applying the enabled spatial relation information to transmit the uplink control information at a next uplink transmission slot boundary on the PCC or the given SCC after a passage of a threshold amount of time (e.g., 3 ms) after an end of the uplink slot in which the ACK message was transmitted.

In an aspect, the device transmitting the uplink control information on the PCC includes the device detecting that the enabled spatial relation information configured for the PCC is not configured for the device and applying second spatial relation information configured for receiving downlink control information (e.g., PDCCH) in a control resource set (CORESET) on the PCC having a lowest CORESET ID to transmit the uplink control information on the PCC.

In another aspect, the device transmitting the uplink control information on the given SCC includes the device detecting that the enabled spatial relation information configured for the given SCC is not configured for the device and determining whether the given SCC is configured with one or more control resource sets (CORESETs) for receiving downlink control information (e.g., PDCCH). If the given SCC is configured with the one or more CORESETs, then the device applies second spatial relation information for receiving the downlink control information in a first CORESET of the one or more CORESETs on the given SCC having a lowest CORESET ID to transmit the uplink control information on the given SCC. If the given SCC is not configured with the one or more CORESETs, then the device applies third spatial relation information for receiving the downlink control information (e.g., PDCCH) in a second CORESET on the PCC having a lowest CORESET ID to transmit the uplink control information on the given SCC.

In a further aspect, the device transmitting the uplink control information on the given SCC includes the device detecting that the enabled spatial relation information configured for the given SCC is not configured for the device and determining whether the given SCC is configured with one or more CORESETs for receiving downlink control information (e.g., PDCCH). If the given SCC is configured with the one or more CORESETs, then the device applies second spatial relation information for receiving the downlink control information in a first CORESET of the one or more CORESETs on the given SCC having a lowest CORESET ID to transmit the uplink control information on the given SCC. If the given SCC is not configured with the one or more CORESETs, then the device applies third spatial relation information for an activated physical downlink shared channel (PDSCH) transmission configuration indicator (TCI) state on the given SCC having a lowest TCI state ID to transmit the uplink control information on the given SCC.

In one configuration, the device 1400 (e.g., UE) for wireless communication includes means for receiving (e.g., configuration receiving circuitry 1440, transceiver 1410, and/or antenna array 1430) configuration information from a second device, the configuration information including an indication to transmit uplink control information via a primary component carrier (PCC) or a given secondary component carrier (SCC) of at least one SCC in a slot, means for receiving (e.g., mapping information processing circuitry 1442, transceiver 1410, and/or antenna array 1430) mapping information from the second device indicating an enabled spatial relation information configured for the PCC or the given SCC for transmitting the uplink control information, means for transmitting (e.g., control information transmitting circuitry 1446, transceiver 1410, and/or antenna array 1430) an acknowledgement (ACK) message to the second device in an uplink slot to acknowledge that the mapping information was correctly received, means for identifying (e.g., spatial relation information processing circuitry 1444 and/or memory 1405) the enabled spatial relation information configured for the PCC or the given SCC based on the mapping information, and means for transmitting (e.g., control information transmitting circuitry 1446, transceiver 1410, and/or antenna array 1430), to the second device, the uplink control information on the PCC or the given SCC in the slot based on the indication included in the configuration information, the enabled spatial relation information, and an uplink resource mapped to the enabled spatial relation information. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1 and 3 and utilizing, for example, the processes and/or algorithms described herein in relation to FIG. 15.

Figure 16:
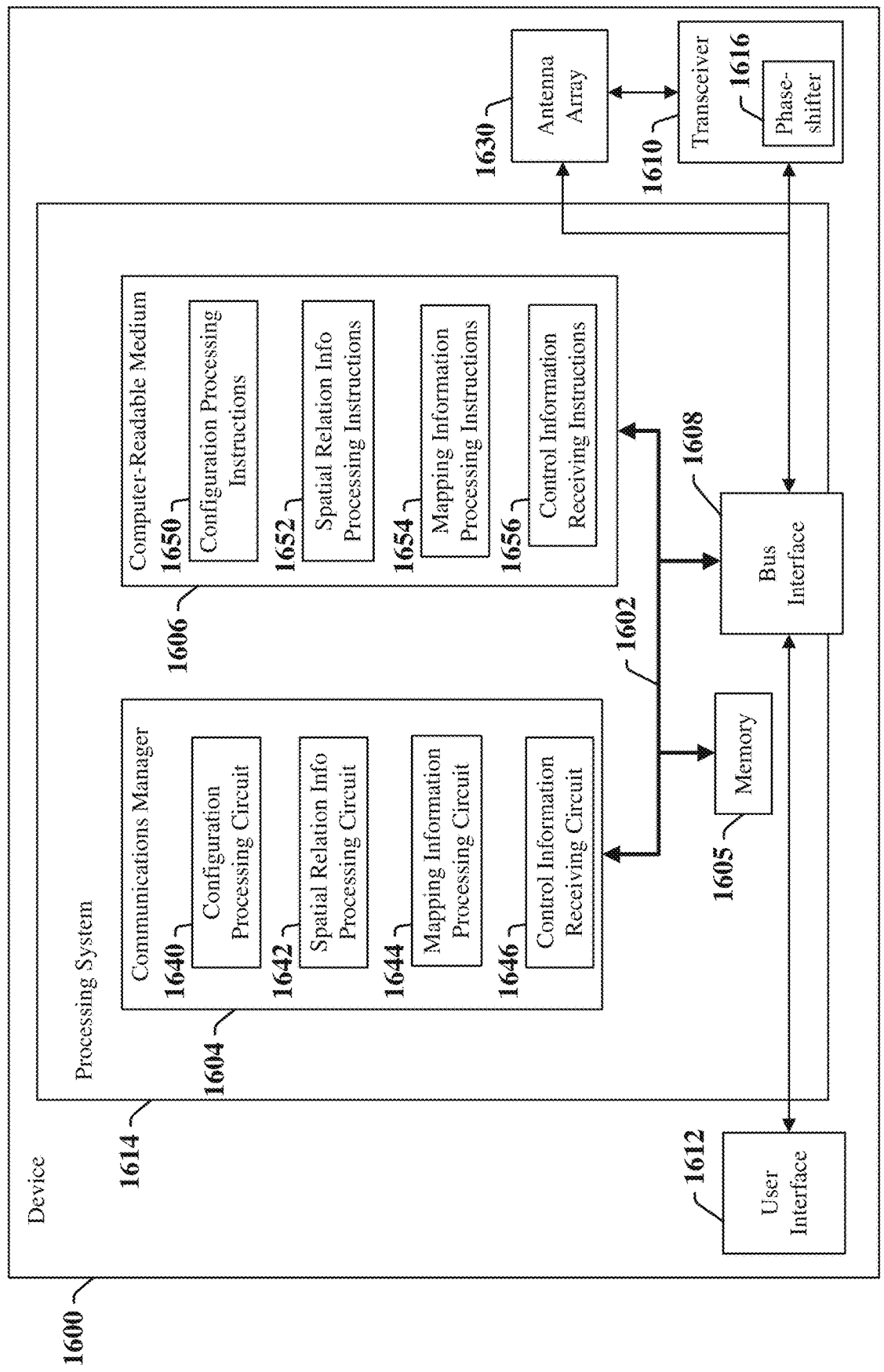
FIG. 16 is a conceptual diagram illustrating an example of a hardware implementation for an exemplary device employing a processing system in accordance with aspects of the present disclosure.

FIG. 16 is a conceptual diagram illustrating an example of a hardware implementation for an exemplary device 1600 employing a processing system 1614. In accordance with various aspects of the disclosure, an element, or any portion of an element, or any combination of elements may be implemented with a processing system 1614 that includes one or more processors 1604 (e.g., communications manager). For example, the device 1600 may be a base station or gNB as illustrated in any one or more of FIGS. 1 and 3.

The processing system 1614 may be substantially the same as the processing system 1414 illustrated in FIG. 14, including a bus interface 1608, a bus 1602, memory 1605, a processor 1604, and a computer-readable storage medium 1606. Furthermore, the device 1600 may include a user interface 1612, a transceiver 1610 (including a phase-shifter 1616), and one or more antenna arrays 1630 substantially similar to those described above in FIG. 14. The processor 1604, as utilized in a device 1600, may include the BS communications manager 199/399 and used to implement any one or more of the processes described below and illustrated in FIG. 18.

In some aspects of the disclosure, the processor 1604 (e.g., BS communications manager 199/399) may include configuration processing circuitry 1640 configured for various functions, including, for example, generating configuration information, the configuration information including an indication to transmit uplink control information via a primary component carrier (PCC) or a given secondary component carrier (SCC) of at least one SCC in a slot and transmitting the configuration information to a second device. For example, the configuration processing circuitry 1640 may be configured to implement one or more of the functions described below in relation to FIG. 17, including, e.g., blocks 1702 and 1704. The processor 1604 may further include spatial relation information processing circuitry 1642 configured for various functions, including, for example, generating mapping information including enabling/activating spatial relation information configured for the PCC or the given SCC for transmitting the uplink control information, wherein the mapping information indicates the enabled spatial relation information. For example, the spatial relation information processing circuitry 1642 may be configured to implement one or more of the functions described below in relation to FIG. 17, including, e.g., block 1706. The processor 1604 may further include mapping information processing circuitry 1644 configured for various functions, including, for example, transmitting the mapping information to the second device. For example, the mapping information processing circuitry 1644 may be configured to implement one or more of the functions described below in relation to FIG. 17, including, e.g., block 1708. The processor 1604 may further include control information receiving circuitry 1646 configured for various functions, including, for example, receiving an acknowledgement (ACK) message from the second device in an uplink slot acknowledging that the mapping information was correctly received by the second device and receiving, from the second device, the uplink control information on the PCC or the given SCC in the slot based on the indication included in the configuration information, the enabled spatial relation information, and an uplink resource mapped to the enabled spatial relation information. For example, the control information receiving circuitry 1646 may be configured to implement one or more of the functions described below in relation to FIG. 17, including, e.g., blocks 1710 and 1712.

In one or more examples, the computer-readable storage medium 1606 may include may include configuration processing instructions 1650 configured for various functions, including, for example, generating configuration information, the configuration information including an indication to transmit uplink control information via a primary component carrier (PCC) or a given secondary component carrier (SCC) of at least one SCC in a slot and transmitting the configuration information to a second device. For example, the configuration processing instructions 1650 may be configured to implement one or more of the functions described below in relation to FIG. 17, including, e.g., blocks 1702 and 1704. The computer-readable storage medium 1606 may further include spatial relation information processing instructions 1652 configured for various functions, including, for example, generating mapping information including enabling/activating spatial relation information configured for the PCC or the given SCC for transmitting the uplink control information, wherein the mapping information indicates the enabled spatial relation information. For example, the spatial relation information processing instructions 1652 may be configured to implement one or more of the functions described below in relation to FIG. 17, including, e.g., block 1706. The computer-readable storage medium 1606 may further include mapping information processing instructions 1654 configured for various functions, including, for example, transmitting the mapping information to the second device. For example, the mapping information processing instructions 1654 may be configured to implement one or more of the functions described below in relation to FIG. 17, including, e.g., block 1708. The computer-readable storage medium 1606 may further include control information receiving instructions 1656 configured for various functions, including, for example, receiving an acknowledgement (ACK) message from the second device in an uplink slot acknowledging that the mapping information was correctly received by the second device and receiving, from the second device, the uplink control information on the PCC or the given SCC in the slot based on the indication included in the configuration information, the enabled spatial relation information, and an uplink resource mapped to the enabled spatial relation information. For example, the control information receiving instructions 1656 may be configured to implement one or more of the functions described below in relation to FIG. 17, including, e.g., blocks 1710 and 1712.

Figure 17:
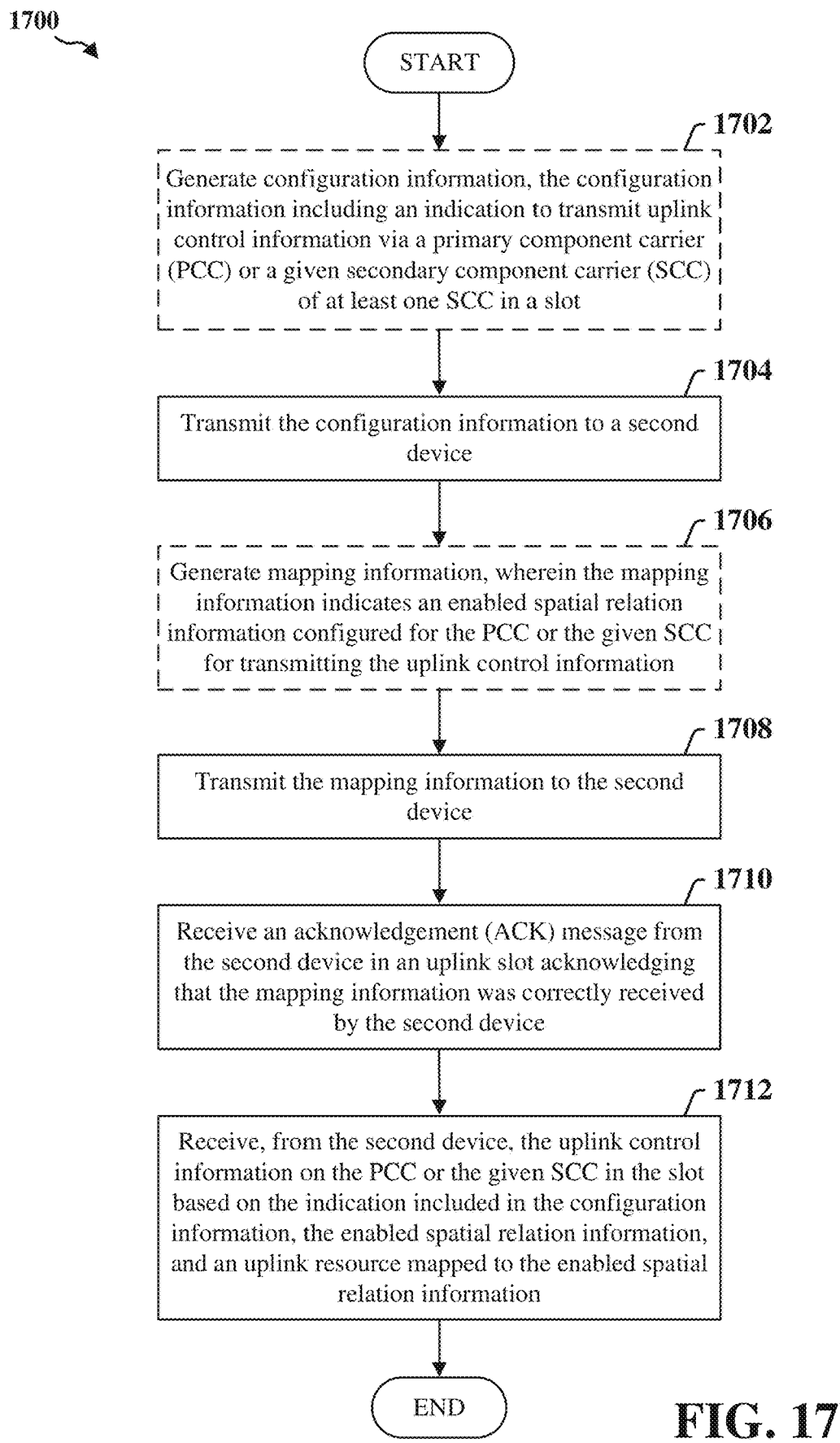
FIG. 17 is a flow chart illustrating an exemplary process for communicating uplink control information in accordance with aspects of the present disclosure.

FIG. 17 is a flow chart illustrating an exemplary process 1700 for communicating uplink control information (e.g., PUCCH) in accordance with aspects of the present disclosure. As described below, some or all illustrated features may be omitted in a particular implementation within the scope of the present disclosure, and some illustrated features may not be required for implementation of all aspects. In some examples, the process 1700 may be carried out by the device 1600 illustrated in FIG. 16, which may be a base station or gNB, as illustrated in any one or more of FIGS. 1 and 3. In some examples, the process 1700 may be carried out by any suitable apparatus or means for carrying out the functions or algorithm described below.

At block 1702, the device generates configuration information. The configuration information includes an indication to transmit uplink control information via a primary component carrier (PCC) or a given secondary component carrier (SCC) of at least one SCC in a slot. In an aspect, the uplink control information is a physical uplink control channel (PUCCH).

At block 1704, the device transmits the configuration information to a second device (e.g., UE). In an aspect, the configuration information is transmitted via downlink control information (DCI) or a radio resource control (RRC) configuration message.

At block 1706, the device generates mapping information. The mapping information may include an identification of one or more first uplink resources (e.g., first PUCCH resources) in the PCC configured for transmitting the uplink control information and an identification of one or more first spatial relation information (e.g., first PUCCH spatial relation information) configured for the PCC respectively mapped to the one or more first uplink resources in the PCC. The mapping information may further include for each of the at least one SCC, an identification of one or more second uplink resources (e.g., second PUCCH resources) in a respective SCC configured for transmitting the uplink control information and an identification of one or more second spatial relation information (e.g., second PUCCH spatial relation information) configured for the respective SCC respectively mapped to the one or more second uplink resources in the respective SCC. In an aspect, generating the mapping information includes the device enabling/activating the spatial relation information configured for the PCC or the given SCC for transmitting the uplink control information. Thus, the mapping information may also include an indication of an enabled/activated spatial relation information configured for the PCC or the given SCC.

In an aspect, the one or more first spatial relation information and the one or more second spatial relation information indicate a beam direction for transmitting the uplink control information based on a configured reference signal (e.g., SSB, CSI-RS, or SRS).

At block 1708, the device transmits the mapping information to the second device. In an aspect, the mapping information is transmitted via a medium access control (MAC)-control element (CE) in a physical downlink shared channel (PDSCH).

At block 1710, the device receives an acknowledgement (ACK) message from the second device in an uplink slot acknowledging that the mapping information was correctly received by the second device.

At block 1712, the device receives, from the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information. In an aspect, the device receiving the uplink information includes the device applying the enabled spatial relation information to receive the uplink control information at a next uplink transmission slot boundary on the PCC or the given SCC after a passage of a threshold amount of time (e.g., 3 ms) after an end of the uplink slot in which the ACK message was received.

In an aspect, the device receiving the uplink control information on the PCC includes, if the enabled spatial relation information configured for the PCC is not configured for the second device, the device applying second spatial relation information configured for transmitting downlink control information in a control resource set (CORESET) on the PCC having a lowest CORESET ID to receive the uplink control information on the PCC.

In another aspect, the device receiving the uplink control information on the given SCC includes, if the enabled spatial relation information for the given SCC is not configured for the second device: 1) the device applying second spatial relation information for transmitting downlink control information in a first control resource set (CORESET) of one or more CORESETs on the given SCC having a lowest CORESET ID to receive the uplink control information on the given SCC if the given SCC is configured with the one or more CORESETs; and 2) the device applying third spatial relation information for transmitting the downlink control information in a second CORESET on the PCC having a lowest CORESET ID to receive the uplink control information on the given SCC if the given SCC is not configured with the one or more CORESETs.

In a further aspect, the device receiving the uplink control information on the given SCC includes, if the enabled spatial relation information for the given SCC is not configured for the second device: 1) the device applying second spatial relation information for transmitting downlink control information in a first CORESET of one or more CORESETs on the given SCC having a lowest CORESET ID to receive the uplink control information on the given SCC if the given SCC is configured with the one or more CORESETs; and 2) the device applying third spatial relation information for an activated physical downlink shared channel (PDSCH) transmission configuration indicator (TCI) state on the given SCC having a lowest TCI state ID to receive the uplink control information on the given SCC if the given SCC is not configured with the one or more CORESETs.

In one configuration, the device 1600 (e.g., base station or gNB) for wireless communication includes means for generating (e.g., configuration processing circuitry 1640 and/or memory 1605) configuration information, the configuration information including an indication to transmit uplink control information via a primary component carrier (PCC) or a given secondary component carrier (SCC) of at least one SCC in a slot, means for transmitting (e.g., configuration processing circuitry 1640, transceiver 1610, and/or antenna array 1630) the configuration information to a second device, means for generating (spatial relation information processing circuitry 1642 and/or memory 1605) mapping information, wherein the mapping information indicates an enabled spatial relation information configured for the PCC or the given SCC for transmitting the uplink control information, means for enabling/activating (spatial relation information processing circuitry 1642 and/or memory 1605) the spatial relation information configured for the PCC or the given SCC for transmitting the uplink control information, means for transmitting (e.g., mapping information processing circuitry 1644, transceiver 1610, and/or antenna array 1630) the mapping information to the second device, means for receiving (e.g., control information circuitry 1646, transceiver 1610, and/or antenna array 1630) an acknowledgement (ACK) message from the second device in an uplink slot acknowledging that the mapping information was correctly received by the second device, and means for receiving (e.g., control information circuitry 1646, transceiver 1610, and/or antenna array 1630), from the second device, the uplink control information on the PCC or the given SCC in the slot based on the indication included in the configuration information, the enabled spatial relation information, and an uplink resource mapped to the enabled spatial relation information. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1 and 3 and utilizing, for example, the processes and/or algorithms described herein in relation to FIG. 17.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of aspects of the present disclosure:

Aspect 1: A method of communicating uplink control information at a first device, comprising: receiving configuration information from a second device, the configuration information including an indication to transmit uplink control information via a primary component carrier (PCC) or a given secondary component carrier (SCC) of at least one SCC in a slot; receiving mapping information from the second device, wherein the mapping information comprises: an identification of one or more first uplink resources in the PCC configured for transmitting the uplink control information and an identification of one or more first spatial relation information configured for the PCC respectively mapped to the one or more first uplink resources in the PCC, and for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC, wherein the mapping information indicates an enabled spatial relation information of the one or more first spatial relation information or the one or more second spatial relation information configured for the PCC or the given for transmitting the uplink control information; identifying the enabled spatial relation information configured for the PCC or the given SCC based on the mapping information; and transmitting, to the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

Aspect 2: The method of aspect 1, wherein the uplink control information is a physical uplink control channel (PUCCH); and the configuration information is received via downlink control information (DCI) or a radio resource control (RRC) configuration message.

Aspect 3: The method of aspect 1 or 2, wherein the mapping information is received via a medium access control (MAC)-control element (CE) in a physical downlink shared channel (PDSCH).

Aspect 4: The method of any one of aspects 1 through 3, wherein the one or more first spatial relation information and the one or more second spatial relation information indicate a beam direction for transmitting the uplink control information.

Aspect 5: The method of any one of aspects 1 through 4, wherein the one or more first uplink resources in the PCC or the one or more second uplink resources in the at least one SCC are resources for transmitting the uplink control information.

Aspect 6: The method of any one of aspects 1 through 5, further comprising: transmitting an acknowledgement (ACK) message to the second device in an uplink slot to acknowledge that the mapping information was correctly received.

Aspect 7: The method of aspects 1 and 6, wherein the transmitting the uplink control information on the PCC or the given SCC in the slot comprises: applying the enabled spatial relation information to transmit the uplink control information at a next uplink transmission slot boundary on the PCC or the given SCC after a passage of a threshold amount of time after an end of the uplink slot in which the ACK message was transmitted.

Aspect 8: The method of aspects 1, 6, and 7, wherein the threshold amount of time is 3 ms.

Aspect 9: The method of any one of aspects 1 through 8, wherein the transmitting the uplink control information on the PCC in the slot comprises: detecting that the enabled spatial relation information configured for the PCC is not configured for the first device; and applying second spatial relation information configured for receiving downlink control information in a control resource set (CORESET) on the PCC having a lowest CORESET ID to transmit the uplink control information on the PCC.

Aspect 10: The method of any one of aspects 1 through 9, wherein the transmitting the uplink control information on the given SCC in the slot comprises: detecting that the enabled spatial relation information configured for the given SCC is not configured for the first device; determining whether the given SCC is configured with one or more control resource sets (CORESETs) for receiving downlink control information; if the given SCC is configured with the one or more CORESETs, applying second spatial relation information for receiving the downlink control information in a first CORESET of the one or more CORESETs on the given SCC having a lowest CORESET ID to transmit the uplink control information on the given SCC; and if the given SCC is not configured with the one or more CORESETs, applying third spatial relation information for receiving the downlink control information in a second CORESET on the PCC having a lowest CORESET ID to transmit the uplink control information on the given SCC.

Aspect 11: The method of any one of aspects 1 through 10, wherein the transmitting the uplink control information on the given SCC in the slot comprises: detecting that the enabled spatial relation information for the given SCC is not configured for the first device; determining whether the given SCC is configured with one or more control resource sets (CORESETs) for receiving downlink control information; if the given SCC is configured with the one or more CORESETs, applying second spatial relation information for receiving the downlink control information in a first CORESET of the one or more CORESETs on the given SCC having a lowest CORESET ID to transmit the uplink control information on the given SCC; and if the given SCC is not configured with the one or more CORESETs, applying third spatial relation information for an activated physical downlink shared channel (PDSCH) transmission configuration indicator (TCI) state on the given SCC having a lowest TCI state ID to transmit the uplink control information on the given SCC.

Aspect 12: A first device comprising at least one processor, and a memory coupled to the at least one processor, the at least one processor and the memory configured to perform a method of any one of aspects 1 through 11.

Aspect 13: A first device comprising at least one means for performing a method of any one of aspects 1 through 11.

Aspect 14: A non-transitory computer-readable medium storing code at a first device, the code comprising instructions executable by a processor to perform a method of any one of aspects 1 through 11.

Aspect 15: A method of communicating uplink control information at a first device, comprising: generating configuration information, the configuration information including an indication to transmit uplink control information via a primary component carrier (PCC) or a given secondary component carrier (SCC) of at least one SCC in a slot; transmitting the configuration information to a second device; generating mapping information, wherein the mapping information comprises: an identification of one or more first uplink resources in the PCC configured for transmitting the uplink control information and an identification of one or more first spatial relation information configured for the PCC respectively mapped to the one or more first uplink resources in the PCC, and for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC, wherein the mapping information indicates an enabled spatial relation information of the one or more first spatial relation information or the one or more second spatial relation information configured for the PCC or the given SCC for transmitting the uplink control information; transmitting the mapping information to the second device; and receiving, from the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

Aspect 16: The method of aspect 15, wherein: the uplink control information is a physical uplink control channel (PUCCH); and the configuration information is transmitted via downlink control information (DCI) or a radio resource control (RRC) configuration message.

Aspect 17: The method of aspect 15 or 16, wherein the mapping information is transmitted via a medium access control (MAC)-control element (CE) in a physical downlink shared channel (PDSCH).

Aspect 18: The method of any one of aspects 15 through 17, wherein the one or more first spatial relation information and the one or more second spatial relation information indicate a beam direction for transmitting the uplink control information.

Aspect 19: The method of any one of aspects 15 through 18, wherein the one or more first uplink resources in the PCC or the one or more second uplink resources in the at least one SCC are resources for transmitting the uplink control information.

Aspect 20: The method of any one of aspects 15 through 19, further comprising: receiving an acknowledgement (ACK) message from the second device in an uplink slot acknowledging that the mapping information was correctly received by the second device.

Aspect 21: The method of aspects 15 and 20, wherein the receiving the uplink control information on the PCC or the given SCC in the slot comprises: applying the enabled spatial relation information to receive the uplink control information at a next uplink transmission slot boundary on the PCC or the given SCC after a passage of a threshold amount of time after an end of the uplink slot in which the ACK message was received.

Aspect 22: The method of aspects 15, 20, and 21, wherein the threshold amount of time is 3 ms.

Aspect 23: The method of any one of aspects 15 through 22, wherein the receiving the uplink control information on the PCC in the slot comprises: if the enabled spatial relation information for the PCC is not configured for the second device, applying second spatial relation information configured for transmitting downlink control information in a control resource set (CORESET) having a lowest CORESET ID on the PCC to receive the uplink control information on the PCC.

Aspect 24: The method of any one of aspects 15 through 23, wherein the receiving the uplink control information on the given SCC in the slot comprises: if the enabled spatial relation information for the given SCC is not configured for the second device, applying second spatial relation information for transmitting downlink control information in a first control resource set (CORESET) of one or more CORESETs on the given SCC having a lowest CORESET ID to receive the uplink control information on the given SCC if the given SCC is configured with the one or more CORESETs, and applying third spatial relation information for transmitting the downlink control information in a second CORESET on the PCC having a lowest CORESET ID to receive the uplink control information on the given SCC if the given SCC is not configured with the one or more CORESETs.

Aspect 25: The method of any one of aspects 15 through 24, wherein the receiving the uplink control information on the given SCC in the slot comprises: if the enabled spatial relation information for the given SCC is not configured for the second device, applying second spatial relation information for transmitting downlink control information in a first control resource set (CORESET) of one or more CORESETs on the given SCC having a lowest CORESET ID to receive the uplink control information on the given SCC if the given SCC is configured with the one or more CORESETs, and applying third spatial relation information for an activated physical downlink shared channel (PDSCH) transmission configuration indicator (TCI) state on the given SCC having a lowest TCI state ID to receive the uplink control information on the given SCC if the given SCC is not configured with the one or more CORESETs.

Aspect 26: A first device comprising at least one processor, and a memory coupled to the at least one processor, the at least one processor and the memory configured to perform a method of any one of aspects 14 through 25.

Aspect 27: A first device comprising at least one means for performing a method of any one of aspects 14 through 25.

Aspect 28: A non-transitory computer-readable medium storing code at a first device, the code comprising instructions executable by a processor to perform a method of any one of aspects 14 through 25.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A first device for communicating uplink control information, comprising:
at least one processor; and
a memory coupled to the at least one processor, the at least one processor and the memory configured to:
receive configuration information from a second device, the configuration information including an indication to transmit uplink control information via a primary component carrier (PCC) or a given secondary component carrier (SCC) of at least one SCC in a slot,
receive mapping information from the second device, wherein the mapping information comprises:
an identification of one or more first uplink resources in the PCC configured for transmitting the uplink control information and an identification of one or more first spatial relation information configured for the PCC respectively mapped to the one or more first uplink resources in the PCC, and
for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC,
wherein the mapping information indicates an enabled spatial relation information of the one or more first spatial relation information or the one or more second spatial relation information configured for the PCC or the given SCC for transmitting the uplink control information; and transmit, to the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

2. The first device of claim 1, wherein:
the uplink control information is a physical uplink control channel (PUCCH);
the configuration information is received via downlink control information (DCI) or a radio resource control (RRC) configuration message; and
the mapping information is received via a medium access control (MAC)-control element (CE) in a physical downlink shared channel (PDSCH).

3. The first device of claim 1, wherein the one or more first spatial relation information and the one or more second spatial relation information indicate a beam direction for transmitting the uplink control information.

4. The first device of claim 1, wherein the at least one processor and the memory are further configured to:
transmit an acknowledgement (ACK) message to the second device in an uplink slot to acknowledge that the mapping information was correctly received.

5. The first device of claim 4, wherein the at least one processor and the memory configured to transmit the uplink control information on the PCC or the given SCC in the slot are further configured to:
apply the enabled spatial relation information to transmit the uplink control information at a next uplink transmission slot boundary on the PCC or the given SCC after a passage of a threshold amount of time after an end of the uplink slot in which the ACK message was transmitted.

6. The first device of claim 5, wherein the threshold amount of time is 3 ms.

7. The first device of claim 1, wherein the at least one processor and the memory configured to transmit the uplink control information on the PCC in the slot are further configured to:
detect that the enabled spatial relation information configured for the PCC is not configured for the first device; and
apply second spatial relation information configured for receiving downlink control information in a control resource set (CORESET) on the PCC having a lowest CORESET ID to transmit the uplink control information on the PCC.

8. The first device of claim 1, wherein the at least one processor and the memory configured to transmit the uplink control information on the given SCC in the slot are further configured to:
detect that the enabled spatial relation information for the given SCC is not configured for the first device;
determine whether the given SCC is configured with one or more control resource sets (CORESETs) for receiving downlink control information;
if the given SCC is configured with the one or more CORESETs, apply second spatial relation information for receiving the downlink control information in a first CORESET of the one or more CORESETs on the given SCC having a lowest CORESET ID to transmit the uplink control information on the given SCC; and
if the given SCC is not configured with the one or more CORESETs, apply third spatial relation information for receiving the downlink control information in a second CORESET on the PCC having a lowest CORESET ID to transmit the uplink control information on the given SCC.

9. The first device of claim 1, wherein the at least one processor and the memory configured to transmit the uplink control information on the given SCC in the slot are further configured to:
detect that the enabled spatial relation information for the given SCC is not configured for the first device;
determine whether the given SCC is configured with one or more control resource sets (CORESETs) for receiving downlink control information;
if the given SCC is configured with the one or more CORESETs, apply second spatial relation information for receiving the downlink control information in a first CORESET of the one or more CORESETs on the given SCC having a lowest CORESET ID to transmit the uplink control information on the given SCC; and
if the given SCC is not configured with the one or more CORESETs, apply third spatial relation information for an activated physical downlink shared channel (PDSCH) transmission configuration indicator (TCI) state on the given SCC having a lowest TCI state ID to transmit the uplink control information on the given SCC.

10. A method of communicating uplink control information at a first device, comprising:
receiving configuration information from a second device, the configuration information including an indication to transmit uplink control information via a primary component carrier (PCC) or a given secondary component carrier (SCC) of at least one SCC in a slot;
receiving mapping information from the second device, wherein the mapping information comprises:
an identification of one or more first uplink resources in the PCC configured for transmitting the uplink control information and an identification of one or more first spatial relation information configured for the PCC respectively mapped to the one or more first uplink resources in the PCC, and
for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC,
wherein the mapping information indicates an enabled spatial relation information of the one or more first spatial relation information or the one or more second spatial relation information configured for the PCC or the given SCC for transmitting the uplink control information; and
transmitting, to the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

11. The method of claim 10, wherein:
the uplink control information is a physical uplink control channel (PUCCH);

the configuration information is received via downlink control information (DCI) or a radio resource control (RRC) configuration message; and
the mapping information is received via a medium access control (MAC)-control element (CE) in a physical downlink shared channel (PDSCH).

12. The method of claim 10, wherein the one or more first spatial relation information and the one or more second spatial relation information indicate a beam direction for transmitting the uplink control information.

13. The method of claim 10, further comprising:
transmitting an acknowledgement (ACK) message to the second device in an uplink slot to acknowledge that the mapping information was correctly received.

14. The method of claim 13, wherein the transmitting the uplink control information on the PCC or the given SCC in the slot comprises:
applying the enabled spatial relation information to transmit the uplink control information at a next uplink transmission slot boundary on the PCC or the given SCC after a passage of a threshold amount of time after an end of the uplink slot in which the ACK message was transmitted.

15. The method of claim 10, wherein the transmitting the uplink control information on the PCC in the slot comprises:
detecting that the enabled spatial relation information configured for the PCC is not configured for the first device; and
applying second spatial relation information configured for receiving downlink control information in a control resource set (CORESET) on the PCC having a lowest CORESET ID to transmit the uplink control information on the PCC.

16. The method of claim 10, wherein the transmitting the uplink control information on the given SCC in the slot comprises:
detecting that the enabled spatial relation information configured for the given SCC is not configured for the first device;
determining whether the given SCC is configured with one or more control resource set (CORESETs) for receiving downlink control information;
if the given SCC is configured with the one or more CORESETs, applying second spatial relation information for receiving the downlink control information in a first CORESET of the one or more CORESETs on the given SCC having a lowest CORESET ID to transmit the uplink control information on the given SCC; and
if the given SCC is not configured with the one or more CORESETs, applying third spatial relation information for receiving the downlink control information in a second CORESET on the PCC having a lowest CORESET ID to transmit the uplink control information on the given SCC.

17. A first device for communicating uplink control information, comprising:
at least one processor; and
a memory coupled to the at least one processor, the at least one processor and the memory configured to:
transmit configuration information to a second device, the configuration information including an indication to transmit uplink control information via a primary component carrier (PCC) or a given secondary component carrier (SCC) of at least one SCC in a slot,
transmit mapping information to the second device, wherein the mapping information comprises:
an identification of one or more first uplink resources in the PCC configured for transmitting the uplink control information and an identification of one or more first spatial relation information configured for the PCC respectively mapped to the one or more first uplink resources in the PCC, and
for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC,
wherein the mapping information indicates an enabled spatial relation information of the one or more first spatial relation information or the one or more second spatial relation information configured for the PCC or the given SCC for transmitting the uplink control information, and
receive, from the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

18. The first device of claim 17, wherein:
the uplink control information is a physical uplink control channel (PUCCH);
the configuration information is transmitted via downlink control information (DCI) or a radio resource control (RRC) configuration message; and
the mapping information is transmitted via a medium access control (MAC)-control element (CE) in a physical downlink shared channel (PDSCH).

19. The first device of claim 17, wherein the one or more first spatial relation information and the one or more second spatial relation information indicate a beam direction for transmitting the uplink control information.

20. The first device of claim 17, wherein the at least one processor and the memory are further configured to:
receive an acknowledgement (ACK) message from the second device in an uplink slot acknowledging that the mapping information was correctly received by the second device; and
apply the enabled spatial relation information to receive the uplink control information at a next uplink transmission slot boundary on the PCC or the given SCC after a passage of a threshold amount of time after an end of the uplink slot in which the ACK message was received.

21. The first device of claim 20, wherein the threshold amount of time is 3 ms.

22. The first device of claim 17, wherein the at least one processor and the memory configured to receive the uplink control information on the PCC in the slot are further configured to:
if the enabled spatial relation information configured for the PCC is not configured for the second device, apply spatial relation information configured for transmitting downlink control information in a control resource set (CORESET) on the PCC having a lowest CORESET ID to receive the uplink control information on the PCC.

23. The first device of claim 17, wherein the at least one processor and the memory configured to receive the uplink control information on the given SCC in the slot are further configured to:
- if the enabled spatial relation information for the given SCC is not configured for the second device,
  - apply second spatial relation information for transmitting downlink control information in a first control resource set (CORESET) of one or more CORESETs on the given SCC having a lowest CORESET ID to receive the uplink control information on the given SCC if the given SCC is configured with the one or more CORESETs, and
  - apply third spatial relation information for transmitting the downlink control information in a second CORESET on the PCC having a lowest CORESET ID to receive the uplink control information on the given SCC if the given SCC is not configured with the one or more CORESETs.

24. The first device of claim 17, wherein the at least one processor and the memory configured to receive the uplink control information on the given SCC in the slot are further configured to:
- if the enabled spatial relation information for the given SCC is not configured for the second device,
  - apply second spatial relation information for transmitting downlink control information in a first control resource set (CORESET) of one or more CORESETs on the given SCC having a lowest CORESET ID to receive the uplink control information on the given SCC if the given SCC is configured with the one or more CORESETs, and
  - apply third spatial relation information for an activated physical downlink shared channel (PDSCH) transmission configuration indicator (TCI) state on the given SCC having a lowest TCI state ID to receive the uplink control information on the given SCC if the given SCC is not configured with the one or more CORESETs.

25. A method of communicating uplink control information at a first device, comprising:
- transmitting configuration information to a second device, the configuration information including an indication to transmit uplink control information via a primary component carrier (PCC) or a given secondary component carrier (SCC) of at least one SCC in a slot;
- transmitting mapping information to the second device, wherein the mapping information comprises:
  - an identification of one or more first uplink resources in the PCC configured for transmitting the uplink control information and an identification of one or more first spatial relation information configured for the PCC respectively mapped to the one or more first uplink resources in the PCC, and
  - for each of the at least one SCC, an identification of one or more second uplink resources in a respective SCC configured for transmitting the uplink control information and an identification of one or more second spatial relation information configured for the respective SCC respectively mapped to the one or more second uplink resources in the respective SCC,
  - wherein the mapping information indicates an enabled spatial relation information of the one or more first spatial relation information or the one or more second spatial relation information configured for the PCC or the given SCC for transmitting the uplink control information; and
- receiving, from the second device, the uplink control information on the PCC or the given SCC in the slot based on the indication included in the configuration information, the enabled spatial relation information, and an uplink resource of the one or more first uplink resources or the one or more second uplink resources mapped to the enabled spatial relation information.

26. The method of claim 25, wherein:
the uplink control information is a physical uplink control channel (PUCCH);
the configuration information is transmitted via downlink control information (DCI) or a radio resource control (RRC) configuration message; and
the mapping information is transmitted via a medium access control (MAC)-control element (CE) in a physical downlink shared channel (PDSCH).

27. The method of claim 25, further comprising:
receiving an acknowledgement (ACK) message from the second device in an uplink slot acknowledging that the mapping information was correctly received by the second device.

28. The method of claim 27, wherein the receiving the uplink control information on the PCC or the given SCC in the slot comprises:
applying the enabled spatial relation information to receive the uplink control information at a next uplink transmission slot boundary on the PCC or the given SCC after a passage of a threshold amount of time after an end of the uplink slot in which the ACK message was received.

29. The method of claim 25, wherein the receiving the uplink control information on the PCC in the slot comprises:
- if the enabled spatial relation information configured for the PCC is not configured for the second device,
  - applying second spatial relation information configured for transmitting downlink control information in a control resource set (CORESET) on the PCC having a lowest CORESET ID to receive the uplink control information on the PCC.

30. The method of claim 25, wherein the receiving the uplink control information on the given SCC in the slot comprises:
- if the enabled spatial relation information for the given SCC is not configured for the second device,
  - applying second spatial relation information for transmitting downlink control information in a first control resource set (CORESET) of one or more CORESETs on the given SCC having a lowest CORESET ID to receive the uplink control information on the given SCC if the given SCC is configured with the one or more CORESETs, and
  - applying third spatial relation information for transmitting the downlink control information in a second CORESET on the PCC having a lowest CORESET ID to receive the uplink control information on the given SCC if the given SCC is not configured with the one or more CORESETs.

* * * * *